US012649527B2

(12) United States Patent
Grable et al.

(10) Patent No.: US 12,649,527 B2
(45) Date of Patent: Jun. 9, 2026

(54) PICKUP TRUCK TAILGATE LATCH

(71) Applicant: BAE Industries, Inc., Auburn Hills, MI (US)

(72) Inventors: David Grable, Rochester Hills, MI (US); Joel Hudson, South Lyon, MI (US); Tristan Putnam, Holly, MI (US)

(73) Assignee: BAE Industries, Inc., Auburn Hills, MI (US)

( * ) Notice: Subject to any disclaimer, the term of this patent is extended or adjusted under 35 U.S.C. 154(b) by 19 days.

(21) Appl. No.: 18/769,842

(22) Filed: Jul. 11, 2024

(65) Prior Publication Data

US 2025/0019012 A1 Jan. 16, 2025

Related U.S. Application Data

(60) Provisional application No. 63/526,222, filed on Jul. 12, 2023.

(51) Int. Cl.
*B62D 33/037* (2006.01)

(52) U.S. Cl.
CPC .................................. *B62D 33/037* (2013.01)

(58) Field of Classification Search
CPC ..................................................... B62D 33/037
USPC ..................................................... 292/341.17
See application file for complete search history.

(56) References Cited

U.S. PATENT DOCUMENTS

| | | | | |
|---|---|---|---|---|
| 4,678,212 A | | 7/1987 | Rubio | |
| 6,290,281 B1 * | | 9/2001 | Durrani | B60J 7/198 |
| | | | | 296/121 |

| | | | | |
|---|---|---|---|---|
| 6,786,070 B1 * | | 9/2004 | Dimig | E05B 77/30 |
| | | | | 292/201 |
| 7,303,218 B2 * | | 12/2007 | Kraenzle | E05B 63/248 |
| | | | | 292/341.17 |
| 7,520,215 B1 * | | 4/2009 | Merritt | A01F 15/07 |
| | | | | 100/88 |
| 8,328,248 B2 * | | 12/2012 | Scherr | B62D 33/037 |
| | | | | 292/196 |
| 10,272,003 B2 | | 4/2019 | Zindler | |
| 10,358,172 B2 | | 7/2019 | Morley | |
| 10,500,983 B2 * | | 12/2019 | Mueller | B60N 2/01583 |
| 10,882,570 B1 | | 1/2021 | Sharp | |
| 10,941,591 B2 | | 3/2021 | Cho | |
| 11,136,795 B2 | | 10/2021 | Im | |
| 11,214,992 B1 | | 1/2022 | Gentry | |
| 11,408,209 B2 | | 8/2022 | Lee | |
| 2004/0155476 A1 * | | 8/2004 | Emery | B60R 11/06 |
| | | | | 296/37.6 |
| 2005/0206173 A1 | | 9/2005 | Lim | |
| 2010/0270745 A1 * | | 10/2010 | Hurlbert | F16J 15/121 |
| | | | | 277/637 |

(Continued)

*Primary Examiner* — Nathan Cumar
(74) *Attorney, Agent, or Firm* — Dinsmore & Shohl LLP

(57) ABSTRACT

A latch assembly for pivotally securing a tailgate to a truck bed including a body adapted to being secured to a side of the tailgate and enclosing each of a pawl and sector. A pivot support is adapted to being secured to each of first and second opposing side locations of the tailgate in alignment with a main pivot extending through said sector. The pawl exhibits projecting portions which oppose circumferentially offset and radial projection portions of the sector. A torque is exerted by the pawl against the sector at selected downward and return upward pivoting directions, permitting rotation of the tailgate between each of upright, intermediate and down positions.

18 Claims, 21 Drawing Sheets

(56)  References Cited

U.S. PATENT DOCUMENTS

| | | | |
|---|---|---|---|
| 2013/0207405 A1 | 8/2013 | Gruber | |
| 2017/0370132 A1* | 12/2017 | Da Deppo | .............. E05B 81/04 |
| 2018/0038139 A1 | 2/2018 | Zindler | |
| 2020/0398907 A1* | 12/2020 | Rosales | .............. B62D 33/0273 |
| 2021/0380192 A1* | 12/2021 | Demond | .................. B62H 1/08 |
| 2022/0381068 A1 | 12/2022 | Heins | |
| 2023/0008925 A1 | 1/2023 | Blank | |
| 2023/0287714 A1* | 9/2023 | Rosales | .................. E05B 81/34 |

* cited by examiner

FIG. 17A
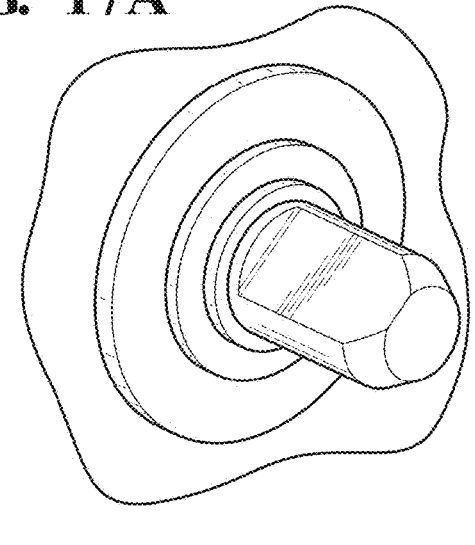
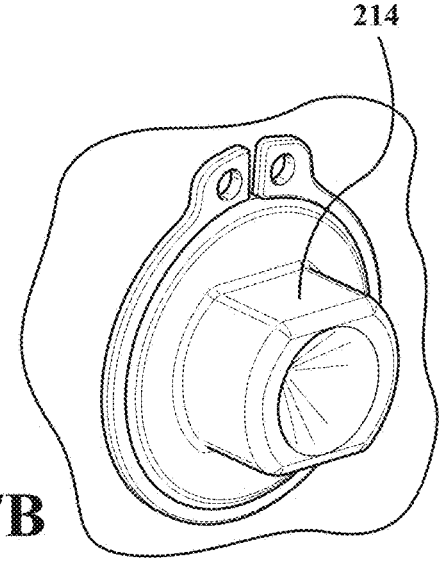
214
FIG. 17B
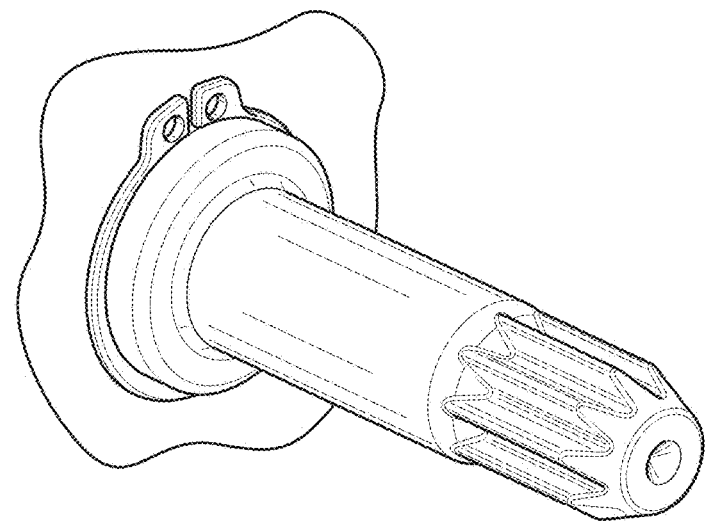
FIG. 17C
FIG. 17D

PICKUP TRUCK TAILGATE LATCH

CROSS REFERENCE TO RELATED APPLICATIONS

The present application claims priority from U.S. Ser. No. 63/526,222 filed Jul. 12, 2023.

FIELD OF THE INVENTION

The present invention relates generally to truck tailgate latches. More specifically, the present invention teaches an improved truck tailgate lower latch which replaces a traditional lower cable and which provides for adjustability of the tailgate between each of a vertical position, one or more intermediate angled positions (typically multiple intermediate positions), and a fully downwardly rotated horizontal position relative to the supporting sidewalls of the truck pickup bed. For purposes of the present invention, the vertical and horizontal positions are defined as establishing a ninety degree angle, with the one or more intermediate positions being at any angular position between zero and ninety degrees.

BACKGROUND OF THE INVENTION

The prior art is documented with examples of truck tailgate latches. A first example of this is shown in U.S. Pat. No. 10,882,570 to Sharp which teaches a tailgate latch system having an actuatable button located on a pickup truck tailgate. At least one rotatable rod is located in the tailgate interior that is configured to rotate clockwise or counterclockwise upon actuating the button and a rotary latch that is configured to disengage a bedside striker pin upon rotation of the at least one rotatable rod.

Also referenced is the retrofit tailgate latching mechanism and method of Blank, US 2023/0008925 which includes a retrofit housing with actuating handle configured to be connected to the tailgate. A linkage assembly is joined with the actuating handle at a proximal end thereof and extends through and within the tailgate toward a stop catch of the truck bed sidewall. A cable is connected between proximal and distal ends of the linkage assembly wherein actuation of the actuating handle to an open position pulls the distal end of the linkage assembly toward the actuating handle and disengages the linkage assembly from the stop catch to permit the tailgate to be pivoted to a lowered position.

SUMMARY OF THE INVENTION

The present invention discloses a latch assembly for pivotally securing a tailgate to a truck bed, including a package interior defining body adapted to being secured to a side of the tailgate and enclosing each of a sector, pawl and cam. A main pivot support is adapted to being secured to an opposing side location of the tailgate, the pivot support including a rotatable portion slaved to the sector. Rotation of the cam in turn actuates the pawl to disengage from the sector, permitting in turn rotation of the tailgate between each of vertical, intermediate angled and fully downwardly rotated horizontal positions relative to the supporting sidewalls of the truck pickup bed.

In any embodiment, the tailgate can be incorporated into either of the exterior or interior sides of the tailgate and includes a reconfigured version of the sector which is rotated via a main pivot. The cam component of the first embodiment is removed, with a redesigned spring loaded pawl engaging the sector at various locations associated with each of upright, intermediate and down positions. Without limitation, the latch assembly can be integrated into a powered version in which a motor actuates the tailgate between the various rotational positions relative to the truck bed.

BRIEF DESCRIPTION OF THE DRAWINGS

Reference will now be made to the attached drawings, when read in combination with the following detailed description, wherein like reference numerals refer to like parts throughout the several views, and in which:

FIGS. 17A-17D respectively depict an end of the main pivot opposite the larger spline exhibiting any of a D shape (see FIG. 17A), a double D or "DD" profile (FIG. 17B), a first configuration of a smaller diameter spline (FIG. 17C), and a second configuration of a smaller spline (FIG. 17D) which interfaces with any of a torsional spring, damper, or electric motor (via its output shaft);

DETAILED DESCRIPTION OF THE PREFERRED EMBODIMENTS

With reference to the attached illustrations, the present invention discloses a lower latch assembly for pivotally securing a tailgate to a truck bed. A package interior defining body is adapted to being secured to a side of the tailgate for enclosing each of a sector, pawl and cam. A pivot support is adapted to being secured to an opposing side location of the tailgate, the pivot support including a rotatable portion slaved to the sector. Rotation of the cam in turn actuating the pawl to disengage from the sector, permitting in turn rotation of the tailgate.

Figure 1:
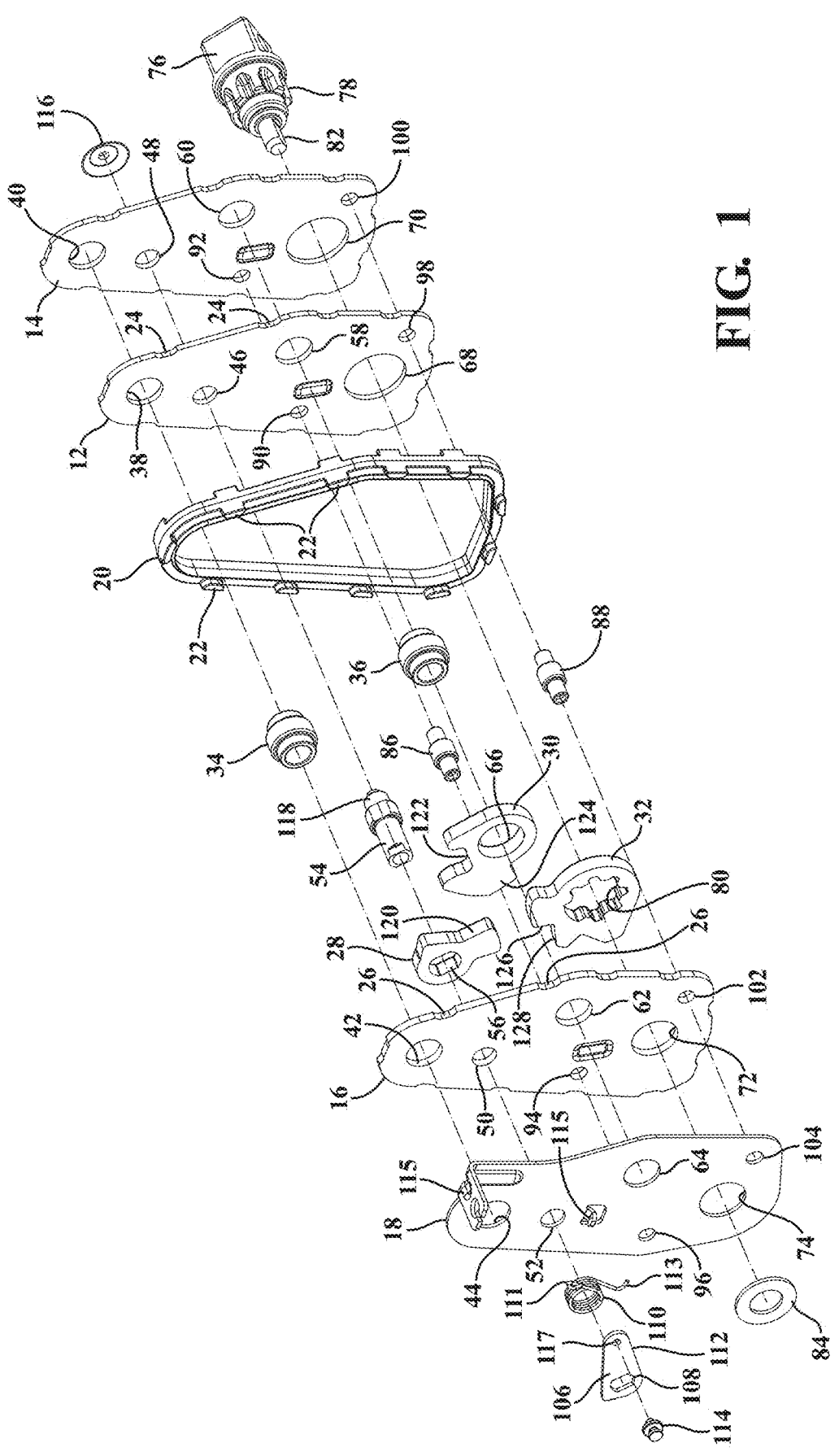
FIG. 1 is an exploded view of the latch assembly according to the present invention.

Referring to FIG. 1, in combination with succeeding views of FIGS. 2-15, an exploded view is shown of the latch assembly according to the present invention. As will be further described, the latch assembly (see as designated at 10 in FIG. 2 et seq.) is typically configured as a lower latch incorporated as a pair of such latches on opposite sides of a truck tailgate 2 (again FIG. 2 et seq.).

In combination, a pair of upper latches 4 are also positioned along the opposite sides of the tailgate 2 above the lower latch assemblies 10. The combination of the upper and lower latches along with cables extending along each side of the tailgate and opposing truck bed operate to support the tailgate in the fully downwardly pivoted open position.

Figures 6, 7:
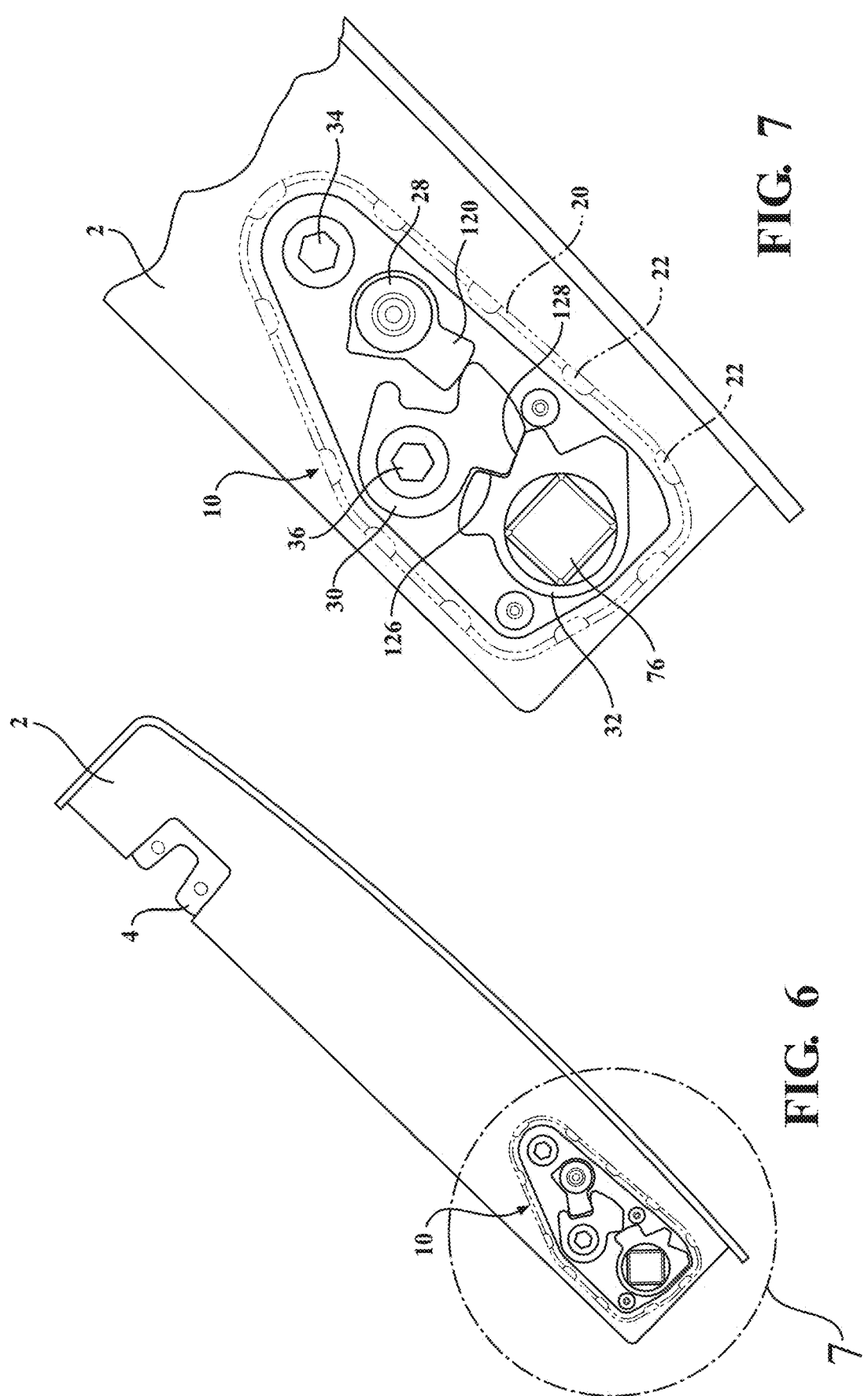
FIG. 6 presents a succeeding view to FIG. 4 and depicting the truck tailgate rotated to an intermediate forty five degree position, at which the lower latch is re-engaged to secure the tailgate in position.
FIG. 7 is an enlargement of the lower latch assembly of FIG. 6 and depicting the lower latch re-engaged at the intermediate tailgate position.
Figure 8:
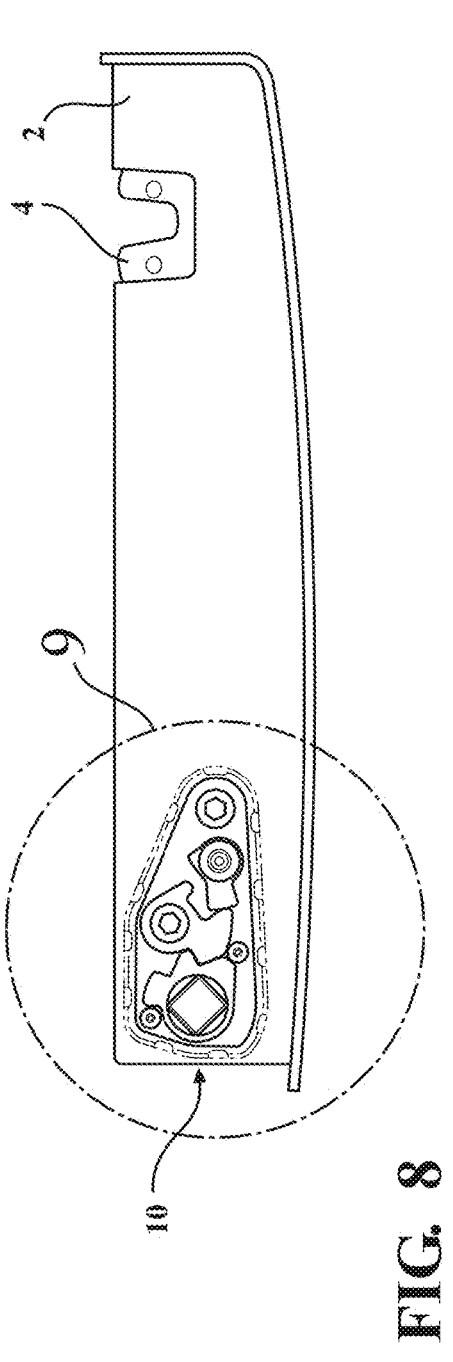
FIG. 8 presents a further succeeding view to FIG. 6 and depicting the truck tailgate in a fully downwardly rotated horizontal position at which the lower latch assembly is re-engaged.

As will be further described, the pair of opposite lower latch assemblies 10 allow for the tailgate to be adjusted between each of a fully upright/closed position (FIG. 4), an intermediate angled, such as 45°, position (FIG. 6) and a fully downwardly rotated and horizontal open tailgate position (FIG. 8). Although not shown, it is understood that that the pawl and sector can be redesigned, such as by adding teeth, in order to accommodate multiple intermediate positions. The ability to establish an intermediate locked position of the tailgate allows for safer and effective securing of items longer than a horizontal length of the truck bed (not shown) to which the tailgate is pivotally secured.

Referring again to FIG. 1, an exploded view is shown of a non-limiting arrangement of components constructing the lower latch assembly 10. A plural arrangement of package defining plates includes each of a pair of rear or inner plates 12 and 14 and an opposing pair or forward or outer plates 16 and 18. Without limitation, the latch assembly also envisions the use of a single plate on either side of package interior components.

Figure 11:
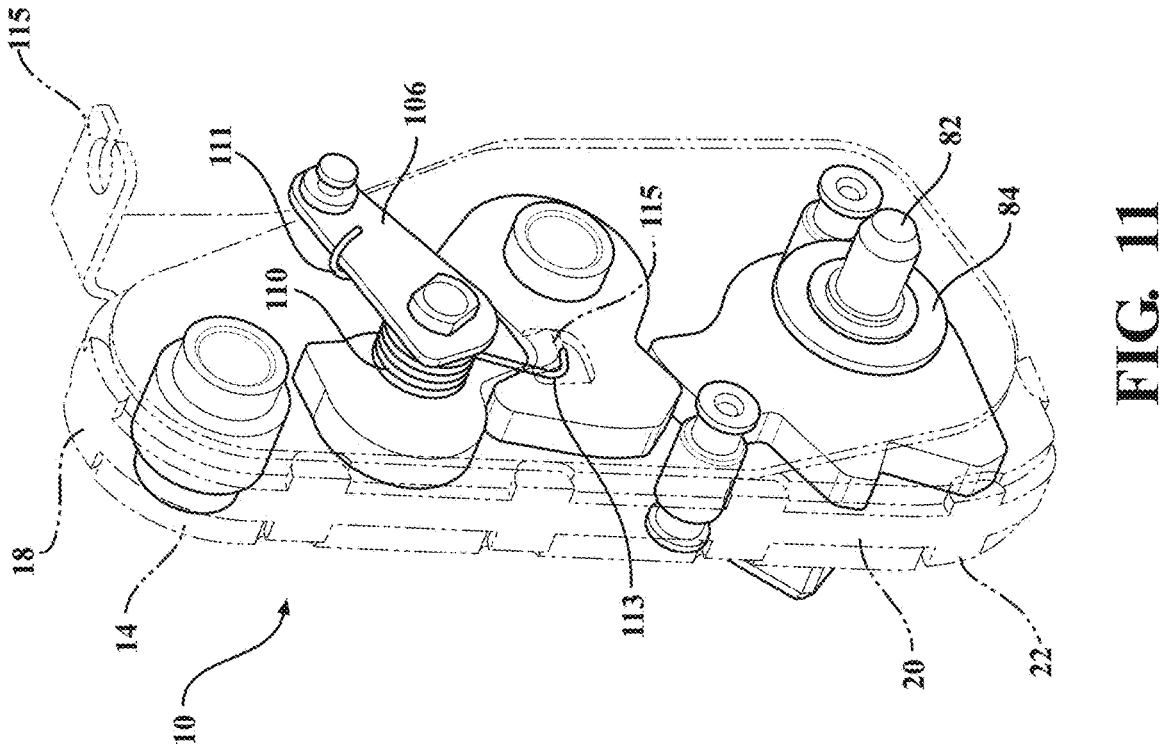
FIG. 11 is a one-hundred and eighty degree rotated view of FIG. 10 and depicting the release cable or link rod system which can be routed inside the tailgate for simultaneously releasing the upper and lower latches when the handle on the back of the tailgate is pulled, as well as depicting a "D" shaped tenon which attaches to a torsional spring located inside of the liftgate for inducing a torque to assist lifting of the tailgate.
Figure 10:
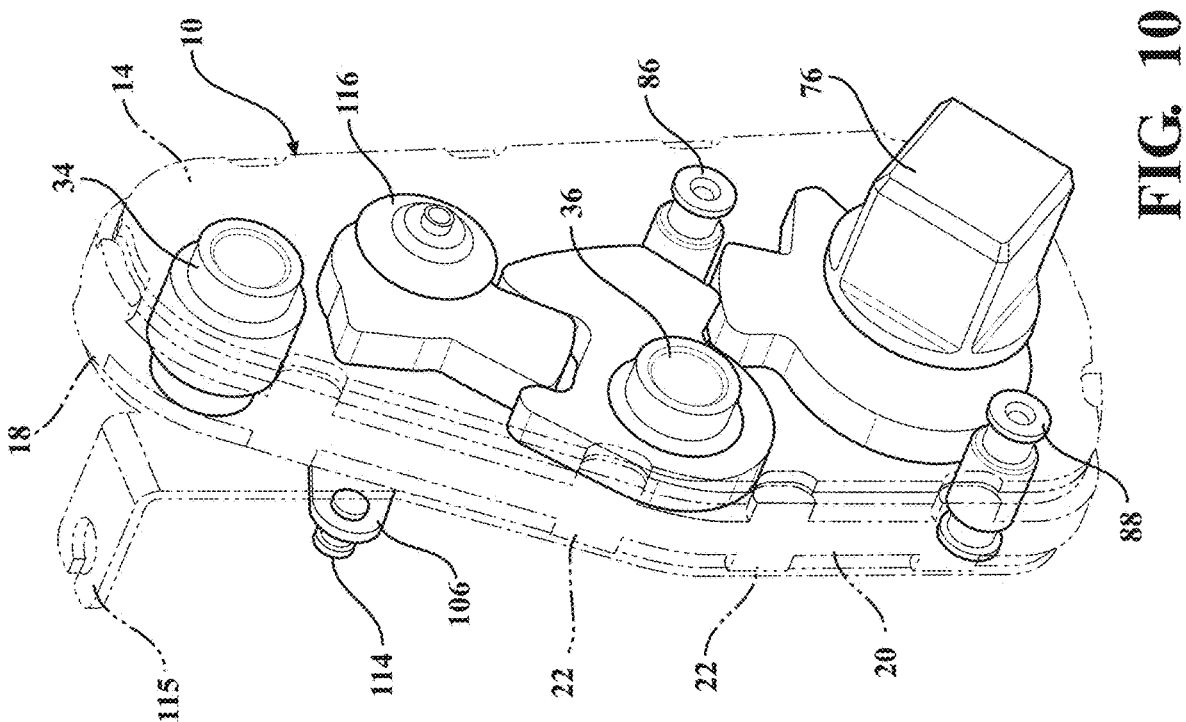
FIG. 10 is a perspective view of the tailgate and further illustrating the latch-to-tailgate mounting bushings as well as the rubber or elastomer seal extending around the perimeter of the assembly in order to protect the internal components of the latch from external contaminants and objects, the presence of which could inhibit operation of the locking mechanism.

An outer gasket or seal 20 is arranged between the pairs of inner and outer plates and which at least overlaps and seals around the inward positioned pair of opposing plates 12 and 16 (see as best shown in FIGS. 10-11) in order to environmentally seal the package interior. As is further best shown in FIG. 2, the seal 20 includes a plurality of perimeter spaced lateral protuberances 22 which align with and resistively engage over notches (at 24 and 26 respectively) associated with the inward opposing plates 12 and 16.

The package defining interior established between the plates 12/14 and 16/18 supports each of a cam 28, pawl 30 and sector 32. A pair of structural supporting bushings 34 and 36 are also provided within the package space, with the lower positioned bushing 36 (which can be without limitation substituted by a rivet) defining pivotal support for the pawl 30.

A plurality of interior rim defining apertures are formed in the package defining plates 12/14 and 16/18 for supporting the various internal components, and includes as shown at 38/40 and 42/44 configured in alignment through the plates 12/14 and 16/18 for supporting the upper bushing 34. Additional aligning apertures are shown at 46/48 and 50/52 for receiving a cam pivot pin having a keyed shaft 54 for seating through a mating keyed interior 56 of the cam 28.

Figure 12:
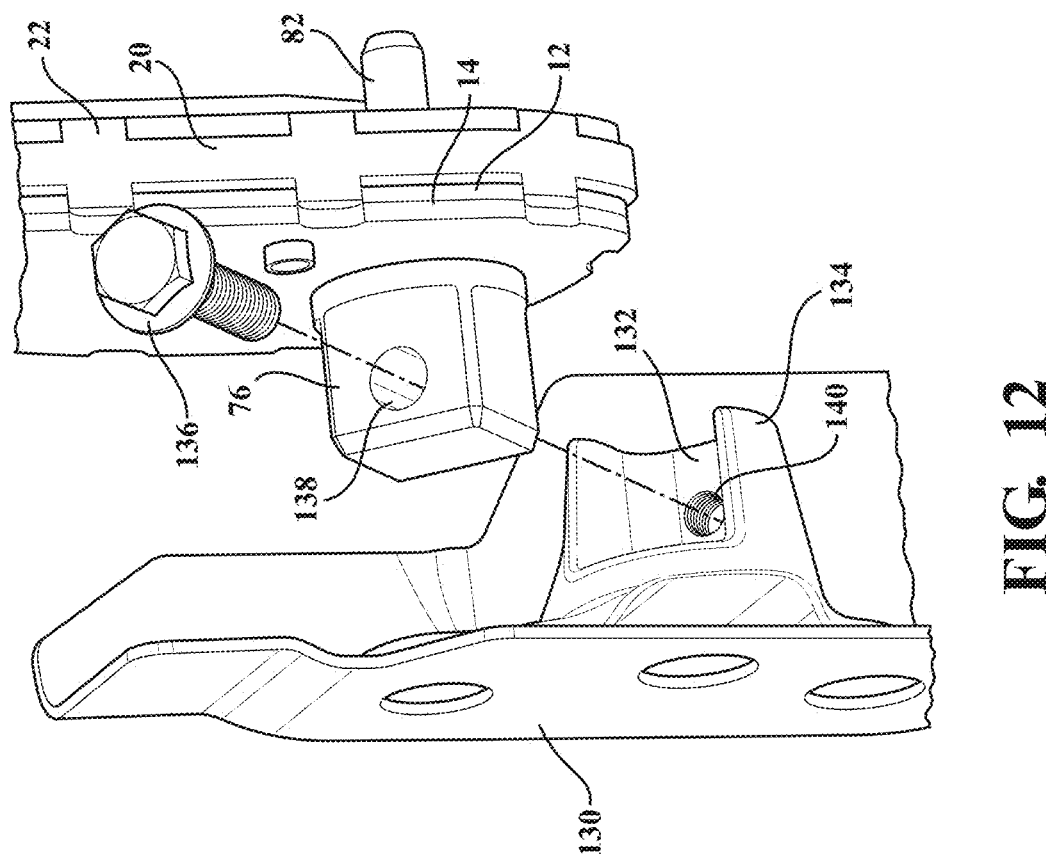
FIG. 12 is an exploded view depicting the pivotally supported attachment of the lower latch assembly to the opposing side edge of the truck bed and which includes brackets mounted to the truck body on both sides of the tailgate, these further including square shaped cavities which receive mating hubs of the main pivot body of the lower latch, with screws installed for engaging the hubs within the cavities.

Pairs of aligning apertures 58/60 and 62/64 seat the lower bushing 36, which in turn again rotatably supports the pawl 30 via an interior rim defining aperture 66. Further aligning pairs of apertures 68/70 and 72/74 seat a main pivot support having a square shaped hub 76 (which as will be further described in reference to FIG. 12 is affixed to a supporting bracket of the truck bed), with the main pivot support further having a circular keyed bearing portion 78, this also generally understood to be a splined portion as depicted in the related embodiment of FIG. 16 et seq.

The sector 32 further exhibits a keyed interior 80, which seats the keyed bearing portion 78 of the pivot support. An end most tenon portion 82 of the main pivot support sets through the outermost aligning aperture 74 and over which is installed a washer 84. As described in FIG. 11, the tenon 82 exhibits a "D" shaped cross section and attaches to a torsional spring (not shown) which is located inside of the liftgate for inducing a lift assisting torque to the tailgate. Without limitation, the keyed portion 78 can be substituted by a spline configuration (see FIG. 16 et. seq.) which can interface with either of a motor assembly or damper component.

A pair of rivets 86 and 88 are also shown which seat through further aligning sets of apertures 90/92 and 94/96 and at 98/100 and 102/104 for providing structural support to the package assembly. The lower positioned rivet 88 also serves as a limiting stop to ensure that the tailgate does not over rotate when in the down position. A release lever 106 has a keyed aperture 108 for receiving the cam pivot pin keyed shaft 54. One or more torsional springs, see at 110, are positioned at right and left handed sides of the latch assembly for biasing the release lever 106 in a clockwise direction as depicted at 112 in FIG. 1. As further shown in each of FIGS. 1 and 11, extending legs 111 and 113 of the torsional spring 110 respectively engage to each of the release lever 106 and a stamped projection 115 in the plate 18.

In the instance of a cabled system, a cable rivet 114 attaches to an aperture 117 located at an end of the release lever 106. In the instance of a link rod configuration and as further depicted in FIG. 11, the cable rivet is removed and a link rod (not shown) is substituted to engage within the aperture 117 where the cable rivet would otherwise be installed. A plastic clip typically is inserted into the aperture 117 prior to installation of the link rod in order to prevent instances of buzz, squeak and rattle (BSR) during operation of the latch assembly. In the up position, the upper latches 4 only are locked whereas, in the intermediate and lowered positions only the lower latches 10 are locked. Also shown is attachment bracket portion 115 configured in plate 18, routed inside of the vehicle tailgate for actuating the assembly when the handle on the rear of the tailgate is pulled or otherwise actuated. Also shown is a cam washer 116 supported against and outer face of the inner most plate 14 for seating an innermost projection 118 of the cam keyed shaft 54.

Figures 2, 3:
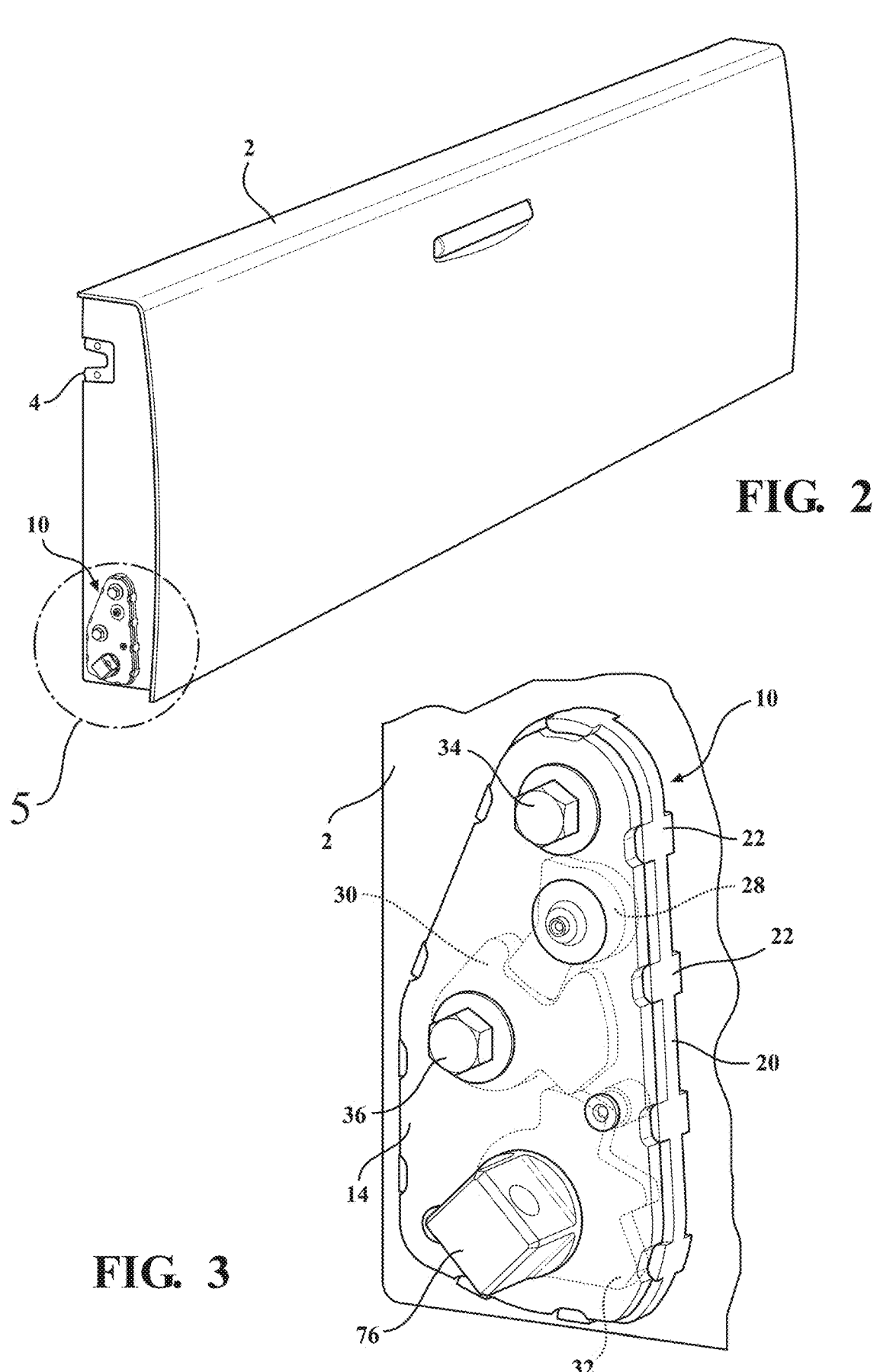
FIG. 2 presents an environmental perspective view of a tailgate incorporating the latch assembly of the present invention as a lower tailgate latch in combination with an upper latch, these being arranged on each of opposite sides of the tailgate for securing the same to opposing locations of the surrounding truck bed.
FIG. 3 is an enlargement of the latch assembly of FIG. 2 depicting selected package defining plates in partially transparent fashion to better illustrate the cam, pawl and sector components.

Referring now to FIG. 2, presented is an environmental perspective view of a tailgate incorporating the latch assembly 10 of the present invention as a lower tailgate latch in combination with the upper latch (symbolically again represented at 4), these again being arranged on each of opposite sides of the tailgate for securing the same to opposing locations of the surrounding truck bed.

FIG. 3 presents an enlargement of the latch assembly of FIG. 2, and depicting selected package defining plates (see at 14) in partially transparent fashion to better illustrate the cam 28, pawl 30 and sector 32 components.

Figure 5:
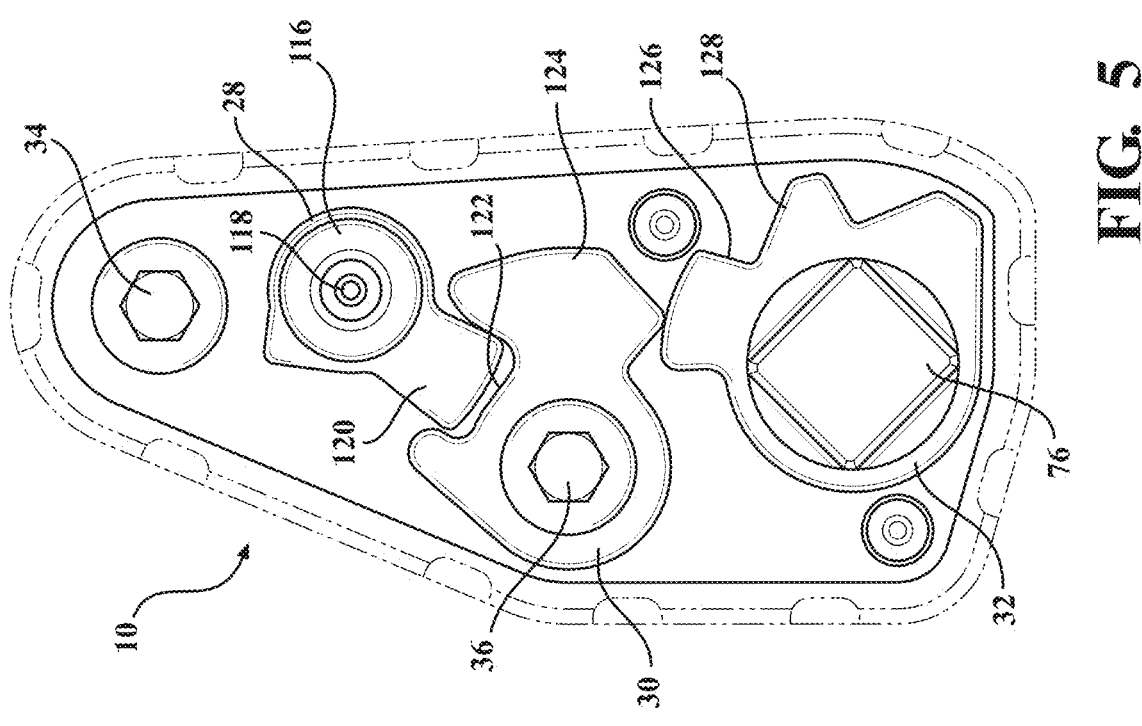
FIG. 5 is an enlargement of the lower latch assembly in FIG. 4 and again showing the cam, pawl and sector components in the unlocked position.
Figure 4:
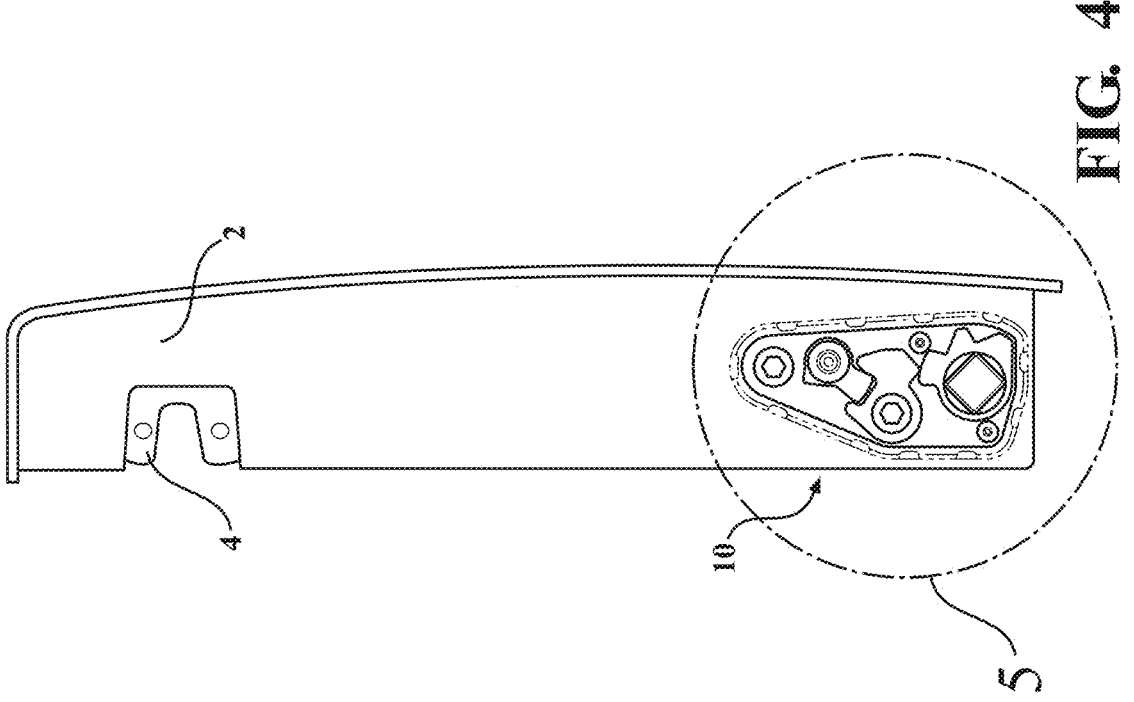
FIG. 4 presents a plan side view of the tailgate in an upright vertical position with the lower latch assembly unlocked and the upper latch locked.

FIG. 4 presents a plan side view of the tailgate 2 in an upright vertical position with the lower latch assembly 10 unlocked and the upper latch 4 locked. FIG. 5 presents an enlargement of the lower latch assembly in FIG. 4 and again showing the cam 28, pawl 30 and sector 32 components in the unlocked position. In this position, a projection 120 of the cam 28 is seated within an opposing pocket recess 122 in the pawl 30. As further shown, a configured projection 124 of the pawl 30 in FIG. 5 is rotated out of engagement with the sector 32, allowing it and the tailgate to rotated (via the circular keyed bearing portion 78 seating the keyed interior 80 of the sector) relative to the hub 76 affixed to the truck bed supported bracket.

FIG. 6 presents a succeeding view to FIG. 4 and depicts the truck tailgate rotated to an intermediate forty five degree position, at which the lower latch 10 is re-engaged to secure the tailgate in position. FIG. 7 is an enlargement of the lower latch assembly of FIG. 6 and depicting the lower latch re-engaged at the intermediate tailgate position, and which is depicted by pawl projection 124 being rotated (via actuation of the cam 28 and its projection 120) into engagement with an opposing and seating interface of the sector 32, which is further referenced by generally normal or perpendicular angled surfaces 126 and 128. In this position, rotation of the sector 32 is constrained by the pawl 30 and pressing force exerted by the cam projection 120.

Figure 9:
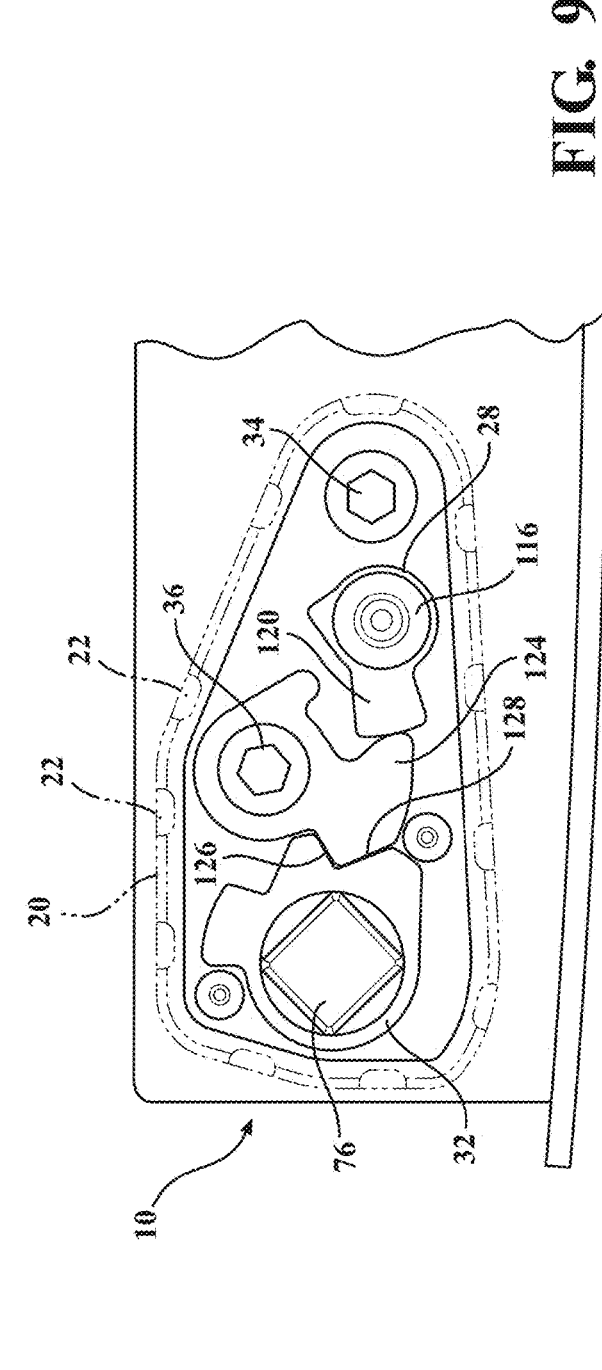
FIG. 9 is an enlargement of the lower latch assembly in FIG. 8 depicting the lower latch in the re-engaged position.

FIG. 8 presents a further succeeding view to FIG. 6 and depicting the truck tailgate 2 in a fully downwardly rotated horizontal position at which the lower latch assembly is re-engaged. FIG. 9 is an enlargement of the lower latch assembly in FIG. 8 depicting the lower latch in the re-engaged position, with the cam 28, pawl 30 and sector 32 in the arrangement previously described in the intermediate rotated position of FIG. 7.

FIG. 10 provides a perspective view of the tailgate and further illustrating the latch-to-tailgate mounting bushings 35 and 36 as well as the rubber or elastomer seal 20 extending around the perimeter of the assembly in order to protect the internal components of the latch from external contaminants and objects, the presence of which could inhibit operation of the locking mechanism.

FIG. 11 is a one-hundred and eighty degree rotated view of FIG. 10 and depicting the release cable or link rod system as previously described, which can be routed inside the tailgate for simultaneously releasing the upper and lower latches when the handle on the back of the tailgate is pulled, as well as depicting a "D" shaped tenon (see again at 82) which attaches to a torsional spring located inside of the liftgate for inducing a torque to assist lifting of the tailgate.

FIG. 12 is an exploded view depicting the pivotally supported attachment of the lower latch assembly to the opposing side edge of the truck bed (see as referenced by body 130). Brackets are provided which include square shaped cavities 132 formed in a seating receptacle 134 configured on an opposing inside face of each bracket mounted to the truck body 130 on both sides of the tailgate 2. The brackets 132/134 receive the mating hubs 76 of the main pivot body of the lower latch, with screws 136 installed through aligning apertures 138 and 140 (see as interiorly threaded) for engaging the hubs 76 within the cavities 132.

Figure 13:
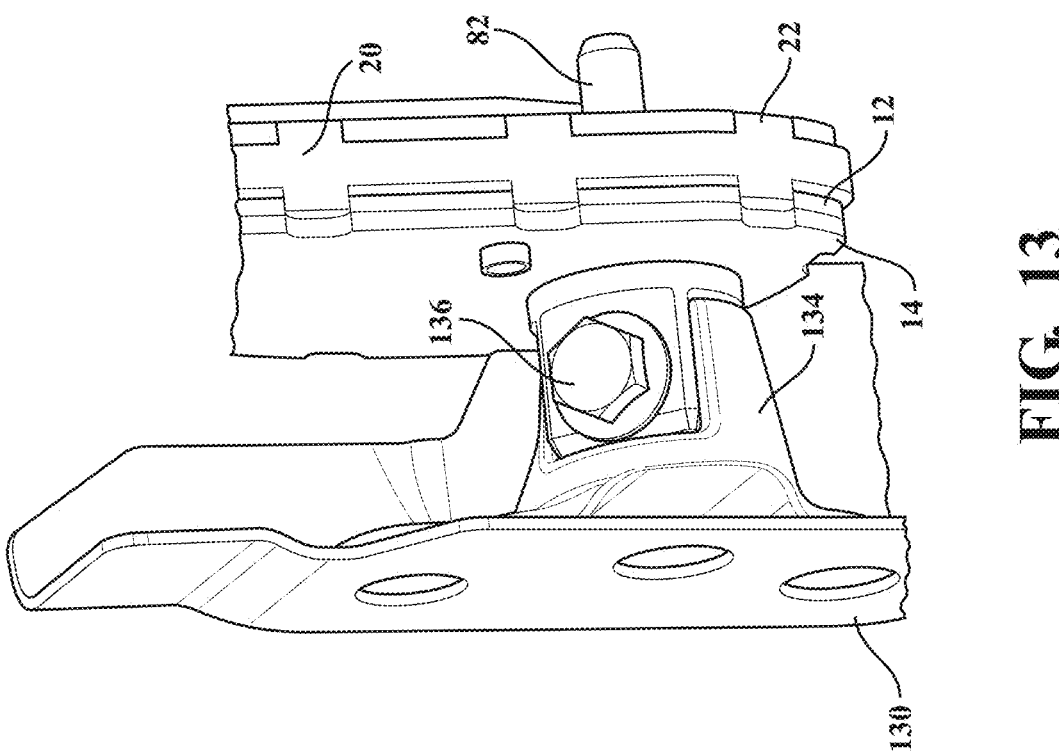
FIG. 13 is a succeeding assembled view of FIG. 12.
Figure 14:
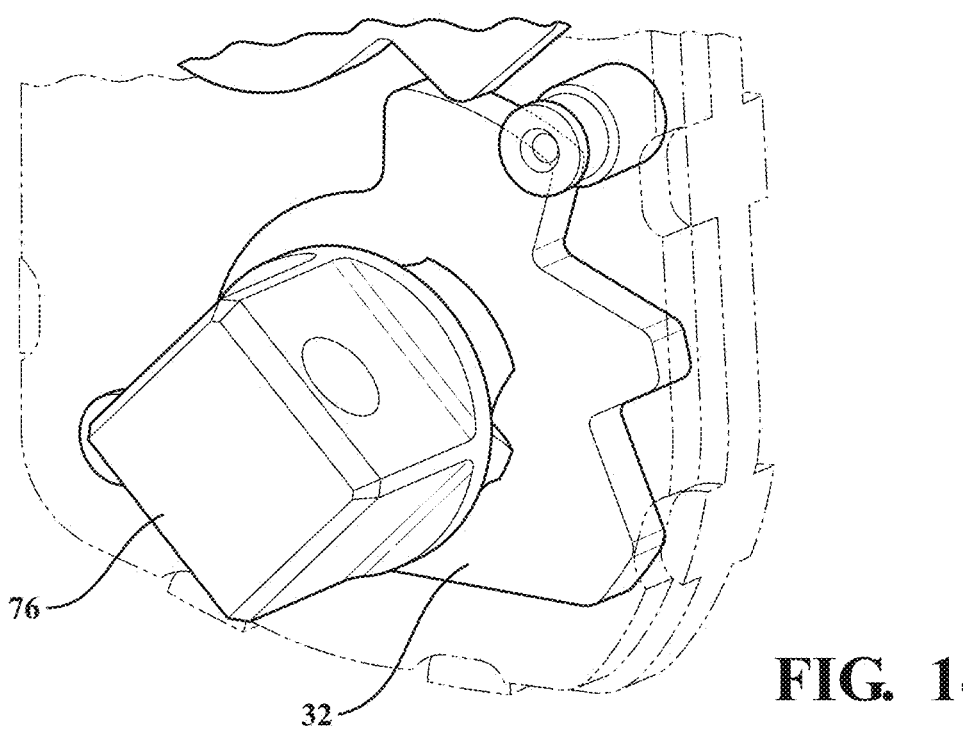
FIG. 14 is a lower sectional view of the latch assembly, after being mounted to the vehicle bed, and depicting the sector and main pivot pin being fixed.
Figure 15:
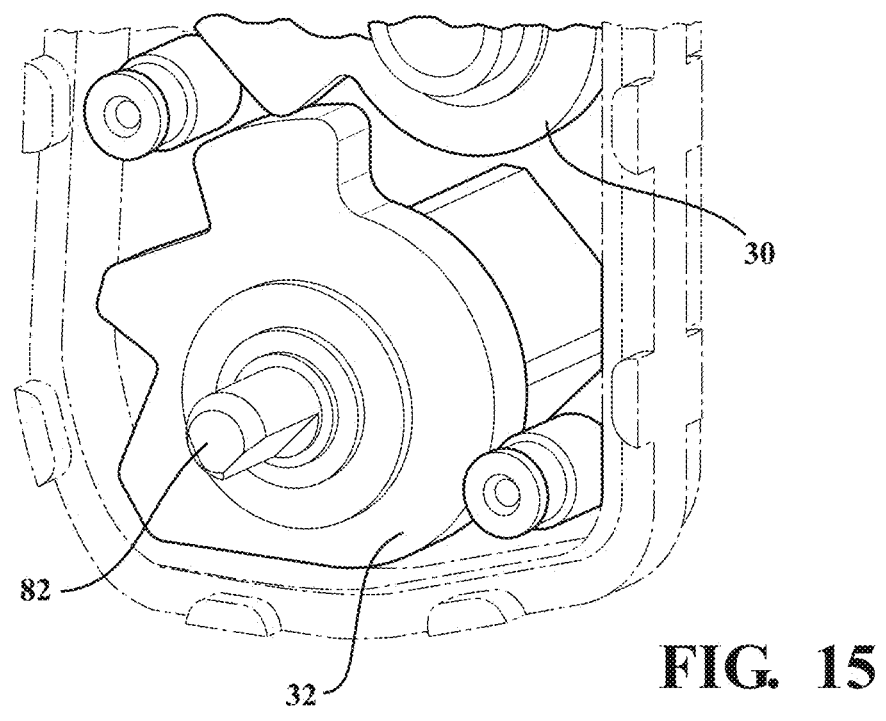
FIG. 15 succeeding FIG. 14 and depicting the latch and tailgate rotating round the fixed sector and fixed portion of the main pivot.

FIG. 13 is a succeeding assembled view of FIG. 12, with FIG. 14 further providing a lower sectional view of the latch assembly, after being mounted to the vehicle bed, and depicting the sector and main pivot pin being fixed. FIG. 15 succeeds FIG. 14 and depicts the latch and tailgate rotating round the fixed sector 32 and fixed portion of the main pivot.

Figure 16:
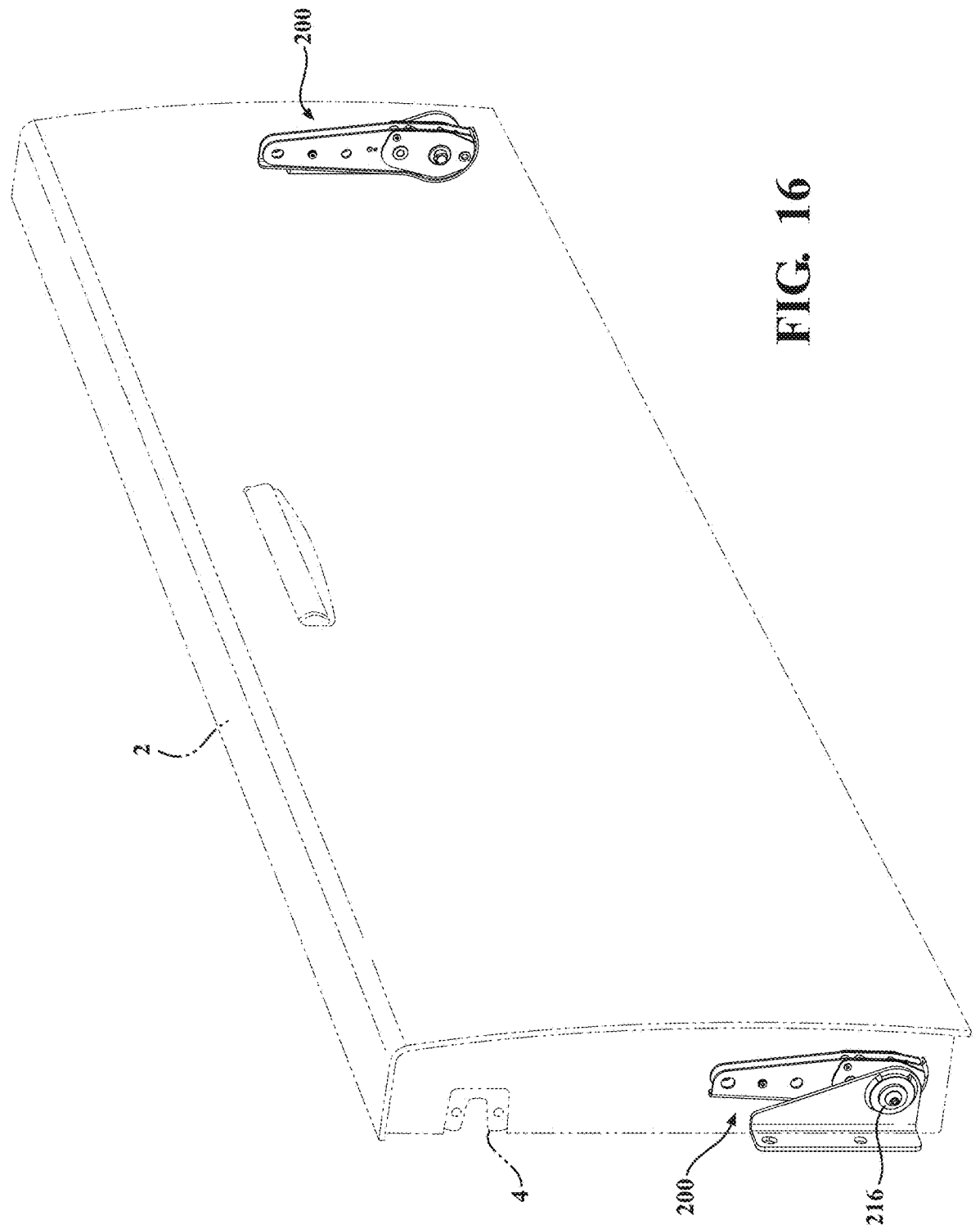
FIG. 16 presents an environmental perspective view of a tailgate incorporating the latch assembly according to a further embodiment of the present invention and which again includes a lower tailgate latch in combination with an upper latch, these being arranged on each of opposite sides of the tailgate for securing the same to opposing locations of the surrounding truck bed.

Referring now to FIG. 16, presented is an environmental perspective view of a tailgate, see again as referenced at 2, incorporating the latch assembly, see generally at 200, according to a further embodiment of the present invention and which again includes a lower tailgate latch in combination with an upper tailgate latch (see again as represented at 4), and which are arranged on each of opposite sides of the tailgate 2 for securing the same to opposing locations of the surrounding truck bed. As previously described in reference to the latch assembly 10 in FIG. 2, the upper latches 4 are present when the cable version is utilized, with the lower latches 10 alone substituting for the cables for supporting the tailgate in the fully downwardly pivoted open position.

Figure 27:
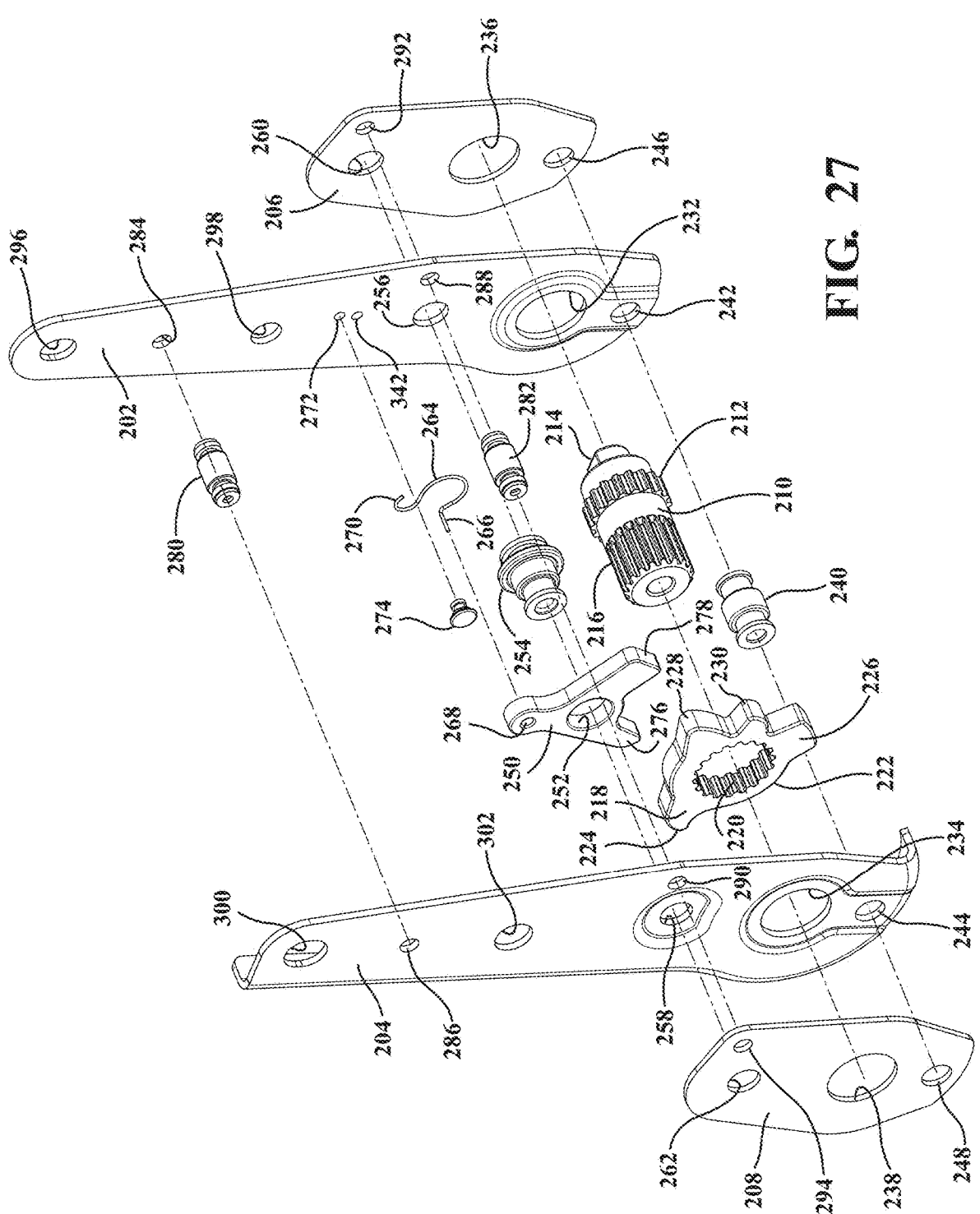
FIG. 27 is an exploded view of the latch assembly according to the embodiment of FIG. 16 et. seq. of the present invention.

FIG. 27 presents an exploded view of a selected latch assembly 200 according to the embodiment of FIG. 16 et. seq. of the present invention and includes an inner plate 202 and an outer plate 204. The package defining structure of the latch can also include outermost doubler plates, see inner-most doubler plate 206 and outer most doubler plate 208 which are secured to the outer faces of each of the inner 202 and outer 204 plates.

A main pivot 210 is provided and includes an intermediate exteriorly toothed or splined portion 212 (such engaging through the redesigned sector as will be further described) along with an end configured "D" shaped profile 214. Also shown is an end-most located geared or splined profile 216 (opposite the "D" profile) which can be engaged by a rotational output of a motor (not shown) in an optional powered variant.

Figures 17, 18, 19:
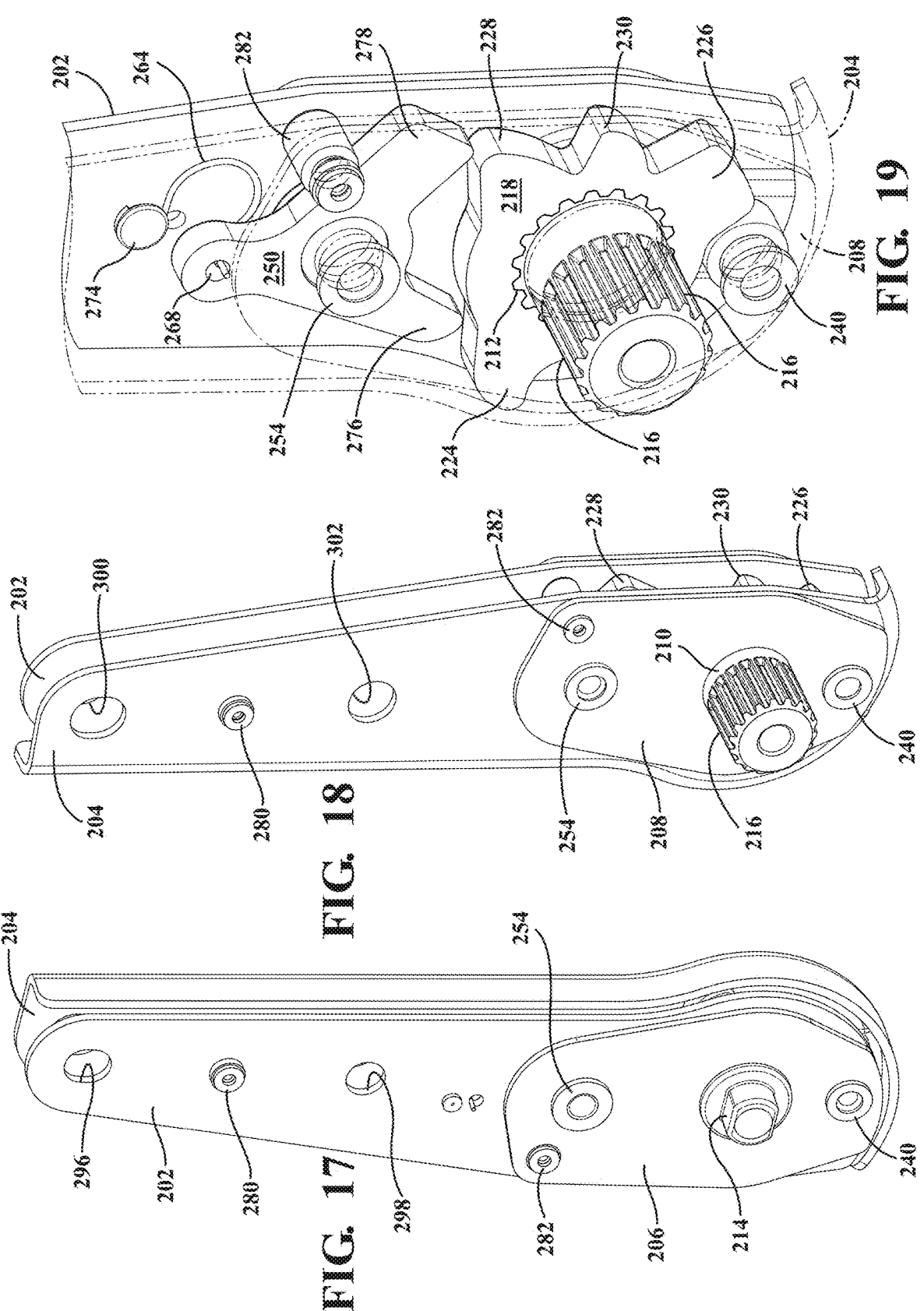
FIG. 17 is a first perspective of tailgate hinge latch assembly of FIG. 16 and depicting each of the upper holes or bushings for mounting the hinge to the tailgate, in combination with a double "D" or spline end configurations of the main pivot, such operable in a variety of variants for interfacing with each of a motor associated with an optional powered variant, a damper component for slowing rotational descent/drop of the tailgate, or a lift assist spring component.
FIG. 18 presents a one hundred and eighty degree rotated view of the latch assembly of FIG. 17 and depicting spline configuration of the main pivot.
FIG. 19 presents a partially transparent view of latch assembly of FIG. 16 and depicting a variation of the ratchet mechanism in which the redesigned pawl incorporating an over center spring, with the external spline pattern again shown which operates as a generic connector that allows for accommodating a variety of truck body mounting scenarios.

The sector is depicted at 218 and includes an interiorly geared profile 220 through which the main pivot 210 extends so that the intermediate splined portion 212 is seated in alignment within the interior profile 220 (see as shown in FIG. 19). The sector 218 includes an arcuate extending exterior portion 222 communicating with spaced apart and radial projecting portions 224 and 226. Additional radial projecting and pawl engaging locations 228 and 230 are designed into the remaining outer circumference of the sector 218.

The main pivot 210 seats through aligning main pivot apertures are configured at 232 and 234 into the inner 202 and outer 204 package defining plates, along with additional apertures 236/238 in the outer most secured doubler plates 206/208. A stop rivet 240 secures to additional aligning apertures 242/244 in the plates 202/204, along with additional aligning apertures 246/248 in the outer doubler plates 206/208, such that the stop rivet is positioned in proximity to the arcuate extending portion 222 of the sector 218 so that the sector exhibits a range of rotation until the stop rivet 240 contacts either of the radial projecting portions 224/226.

A pawl 250 includes a central aperture 252 through which is seated a pawl pivot rivet 254 which in turn seats through aligning apertures 256/258 in the plates 202/204, along with corresponding apertures 260/262 in the outermost doubler plates 206/208. Alternatively, a curved omega spring 264 (which can be provided as a pair of springs 264) is provided for each latch assembly and which includes a first straight extending end 266 which seats through an upper end located aperture 268 in the pawl 250, along with a second curved extending end 270 which aligns with an aperture 272 configured in the inner package defining plate 202 and is retained in place by a spring securing rivet 274. Also shown is a lower proximate aperture (see as further shown at 342 in FIG. 29) which can be alternatively provided for engaging the corresponding end 270 of the spring 264 without use of the rivet 274. The pawl 250 further depicts first 276 and second 278 portions projecting from an end opposite the upper end aperture 268 so that rotation of the pawl 250 about the central aperture 252 results in the pawl 250 contacting the sector 218 at specific positions.

A pair of rivets 280 and 282 engage respective pairs of securing apertures 284/286 and 288/290 in the inner 202 and outer 204 plates, with additional aligning and overlapping apertures 292/294 in the doubler plates 206/208 providing structural support to the package assembly. Finally, pairs of holes or bushings are referenced at 296/298 and 300/302 for each of the inner 202 and outer 204 plates for mounting the hinge latch assembly to the opposing supporting sides of the tailgate 2.

Referring now to FIG. 17, a first perspective view is shown of tailgate hinge latch assembly of FIG. 16 and depicting each of the upper holes or bushings, again 296/298 and 300/302 for mounting the hinge latch assembly 200 to the tailgate 2, in combination with the double "D" 214 and spline 216, such operable in a variety of variants for interfacing with each of a motor associated with an optional powered variant, a damper component for slowing rotational descent/drop of the tailgate, or the lift assist spring component (again at 264). As understood, the larger external spline 216 (or alternatively the square shaped hub 76 as depicted in latch embodiment 10) is only used to mount to the truck bed (via the mounting bracket sub-assembly or other means such as which is depicted in subsequent FIG. 22). The end of the main pivot 210 opposite the big spline 216 can exhibit any of a "D" shaped profile (see FIG. 17A), double D or "DD" profile (FIG. 17B) (again at 214 in FIG. 17)) or a smaller diameter spline (see alternate versions shown in FIGS. 17C and 17D) and which interfaces with any of a torsional spring, damper, or electric motor (via its output shaft). Additionally the outboard side of a latch can exhibit either a square hub or large spline, with the inboard side of the latch exhibiting any of a DD shape, a single D (small diameter), or a smaller spline shape.

FIG. 18 presents a one hundred and eighty degree rotated view of the latch assembly of FIG. 17 and depicting spline configuration 216 of the main pivot 210. FIG. 19 presents a partially transparent view of latch assembly of FIG. 16 and depicting a variation of the ratchet mechanism in which the redesigned pawl 250 incorporating the over center spring 264, with the external spline pattern 216 again shown which operates as a generic connector that allows for accommodating a variety of truck body mounting scenarios.

Figures 20, 21:
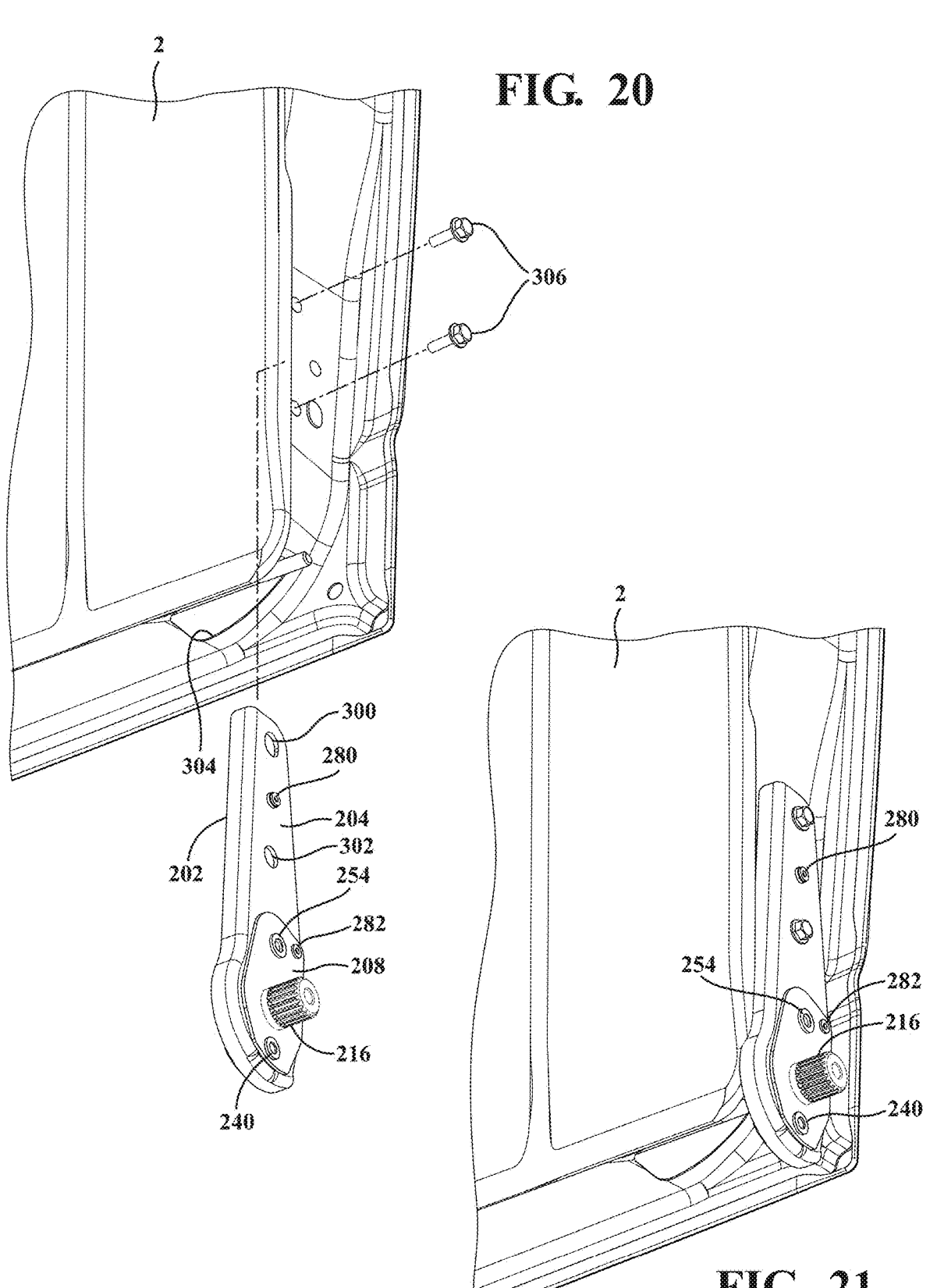
FIG. 20 presents an exploded view of the latch assembly being inserted into a bottom corner facing aperture of the tailgate for providing an internal mounting option.
FIG. 21 illustrates an assembled view of a further mounting variant in which the latch assembly is mounted to an outside surface of the tailgate.

FIG. 20 presents an exploded view of the latch assembly with alternate mounting options relative to the tailgate 2 and which, in a first instance, can include being inserted into a bottom corner facing aperture (see inner perimeter defining rim edge 304) of the tailgate 2 for providing an internal mounting option, and so that the spline 216 projects downwardly. Bolts 306 are provided for securing the latch assembly in place (via aligning pairs of apertures 300/302 and 296/298 in plates 204 and 202). FIG. 21 illustrates an assembled view of a further mounting variant in which the latch assembly is mounted to the outside surface of the tailgate depicted in FIG. 20. The present invention contemplates any of interior or exterior tailgate mounting configurations for the latch assembly.

Figures 22, 23:
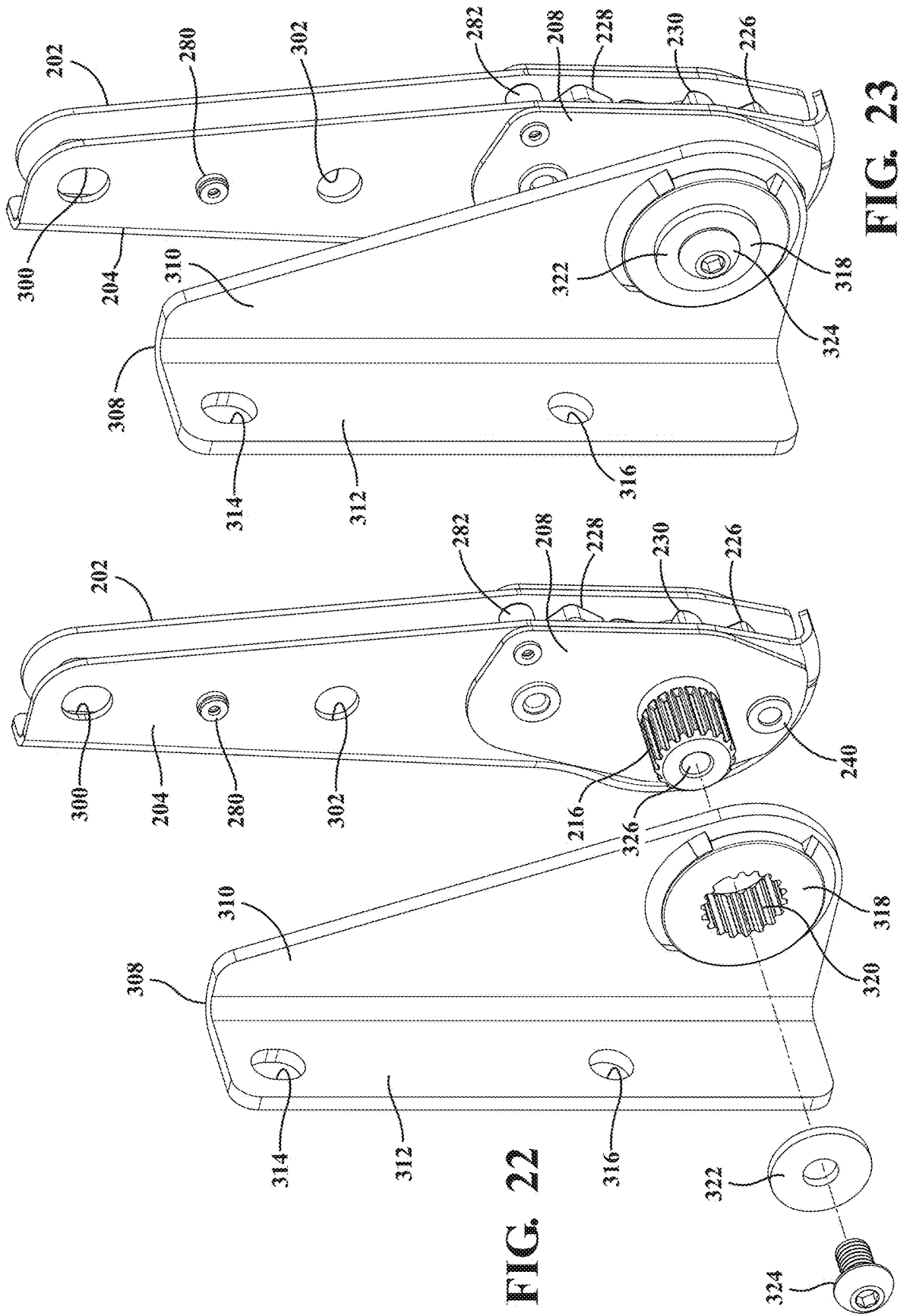
FIGS. 22-24 present a series of exploded, assembled and environmental installed view of the latch assembly and including a pivotally supporting mounting bracket which are mounted to side facing locations of the truck bed opposing the tailgate.
Figure 24:
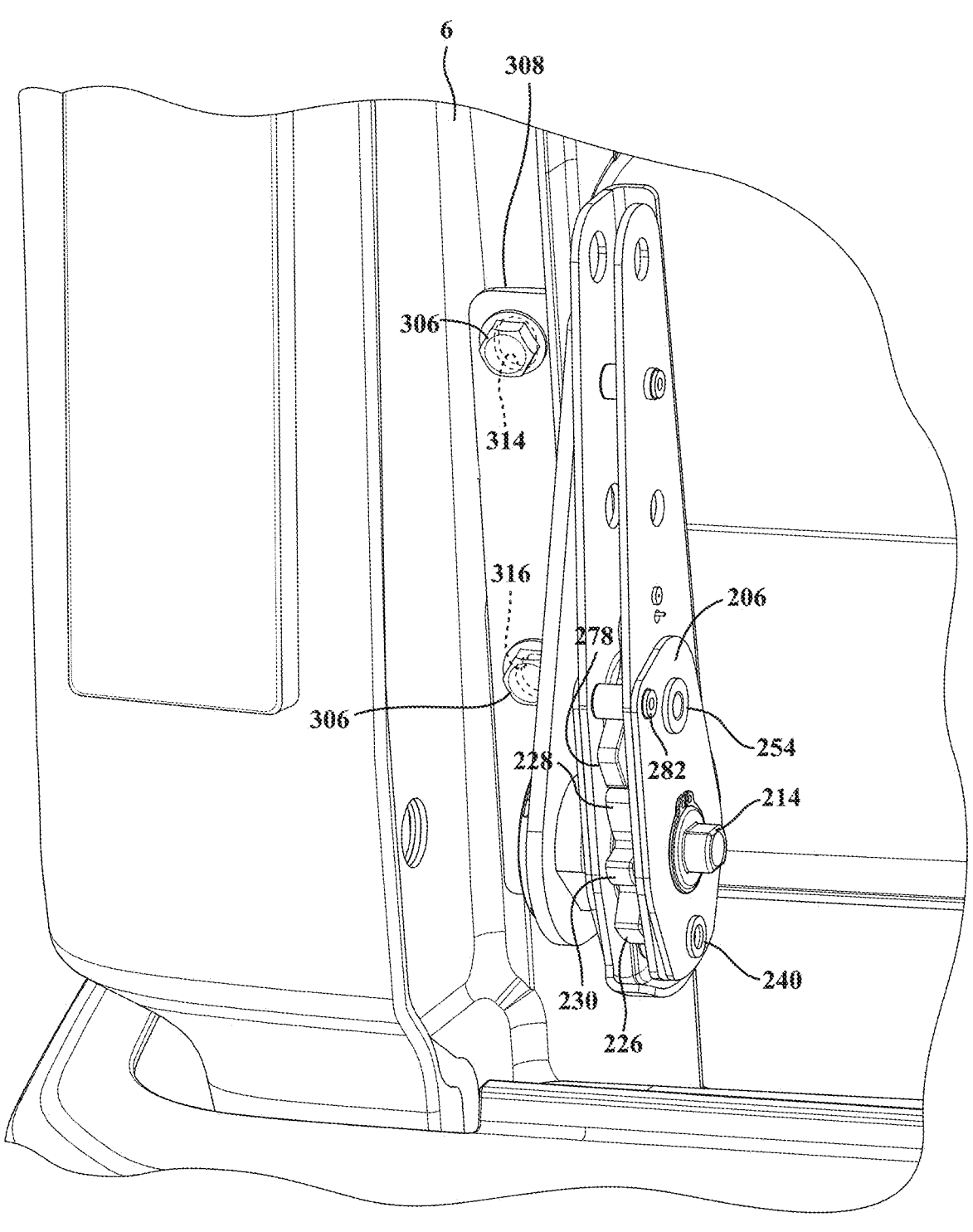

Proceeding now to FIGS. 22-24, presented are a series of exploded, assembled and environmental installed view of the latch assembly and including supporting mounting brackets 308, a pair of which are provided and mounted to rear facing locations of the truck bed 6 opposing the tailgate 2. Without limitation, the supporting bracket 308 exhibits an angled shape with a first latch support side 310 and a second mounting side 312, the second side having bolt receiving holes 314/316 for mounting to the truck bed. Also shown are the mounting bolts 306 previously identified in FIG. 20 and arrayed in the further mounting configuration shown.

The latch support side 310 of the bracket further incorporates a lower spline mount 318 exhibiting an inner aperture spline pattern 320 which receives the spline 216 of the main pivot 210. A washer 322 and attachment screw 324 are provided for securing the spline 216 (via an exposed threaded interior aperture 326)

Figure 25:
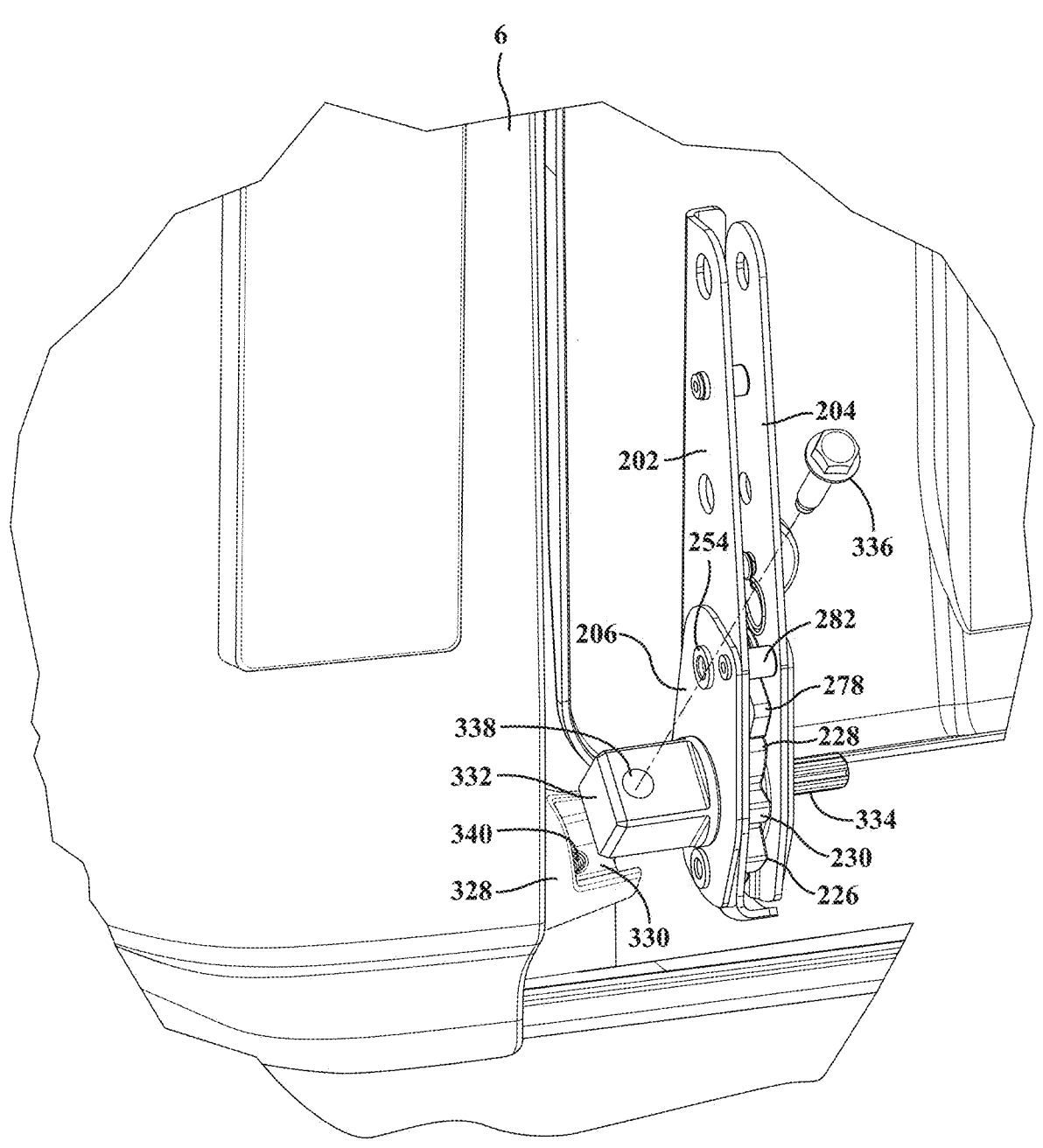
FIGS. 25-26 depict a pair of exploded and assembled environmental view of the tailgate latch assembly according to the present invention which is installed in rotationally supporting fashion to each of opposing side locations of the truck bed according to an existing support bracket and square shaped mounting configuration of a main pivot.
Figure 26:
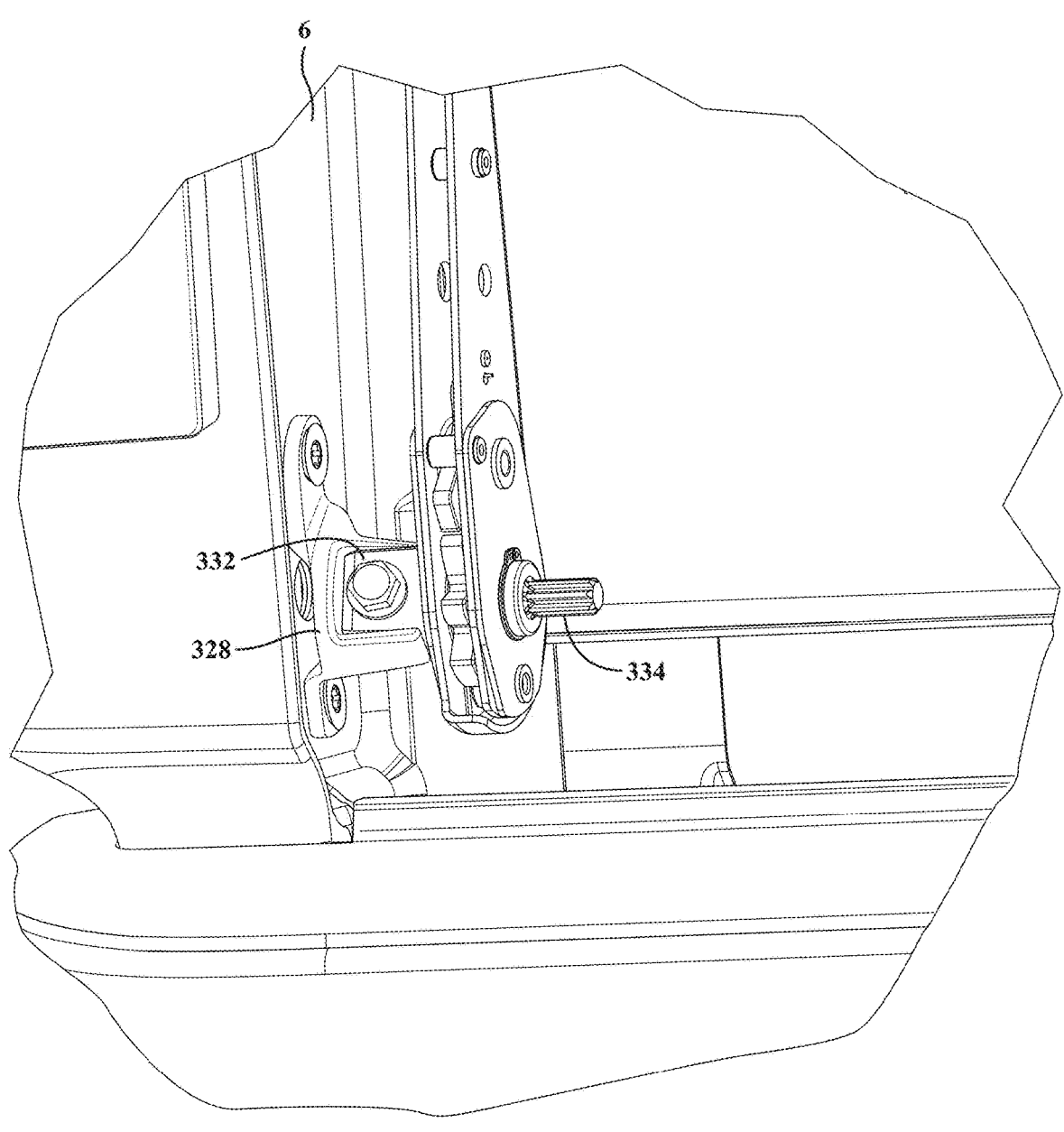

FIGS. 25-26 depict a pair of exploded and assembled environmental view of the tailgate latch assembly according to the present invention, which is installed in rotationally supporting fashion to each of opposing side locations of the truck bed, again at 6, according to an existing configuration of support bracket. This is further depicted by casting 328 which exhibits a contoured pocket 330 for receiving a reconfigured square shaped mounting hub 332 configuration of a main pivot. Also shown is a square hub 334 (see as compared to spline previously depicted in 216 in FIG. 27) which can be alternatively utilized for mounting to the vehicle for interfacing with any of a motor, damper or torsion bar spring, according to a variety of alternate configurations of the present assembly. A fastener 336 mounts the square shaped hub 332, via an internal aperture 338, which rotationally engages an interiorly threaded aperture 340 configured in the casting pocket 330 in order to mount the latch assembly.

Figures 28, 29, 30:
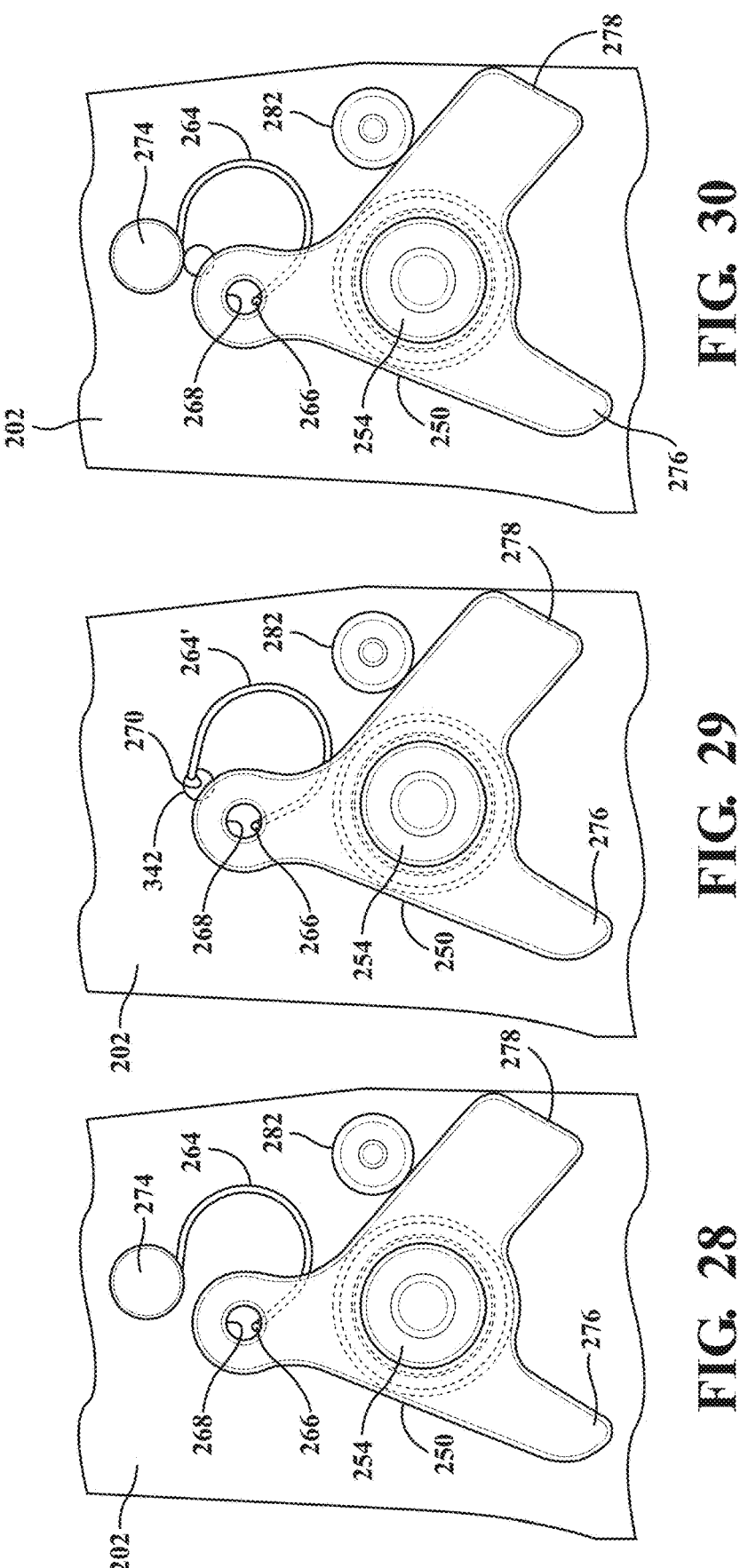
FIGS. 28-30 present a series of sectional views of the pawl component rotationally mounted between the inner and outer support plates, respectively via each of an omega spring and rivet, an aperture formed in the inner plate, or a torsional/coil spring.

Proceeding to FIGS. 28-30, presented are a series of sectional views of the pawl component 250 rotationally mounted between the inner and outer support plates (202/204), respectively via each of an omega spring (again at 264) and rivet 274 as shown in FIG. 28. As shown in FIG. 29, aperture 342 is configured in the inner plate 202 for receiving the end 270 of differently modified spring, see at 264', without the use of the spring rivet 274. As further shown in FIG. 30, the spring configuration 264 of FIG. 28 provides the desired bias to the pawl 250 between the various positions established by the latch assembly.

Figures 31, 32:
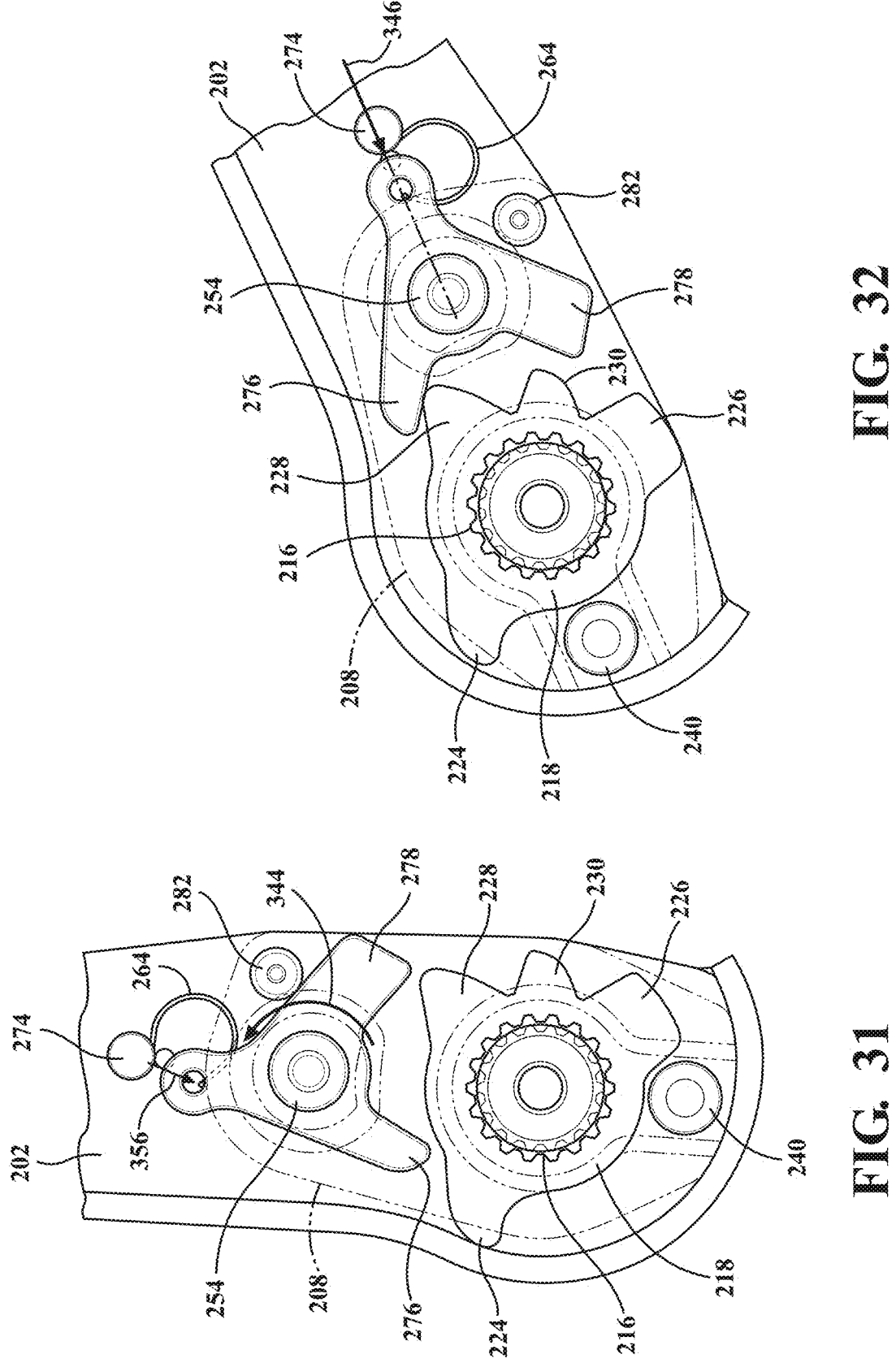
FIG. 31 presents a lower sectional view of the tailgate latch in the upright position in which the pawl is depicted in an open/disengaged position so that the tailgate is free to rotate downwardly.
FIG. 32 presents a similar view to FIG. 31 and depicting the tailgate latch in an intermediate pivoted threshold position in which there is no torque exerted on the pawl from the spring, beyond which continued downward rotation of the tailgate causes a reverse torque to be exerted on the pawl.
Figure 36:
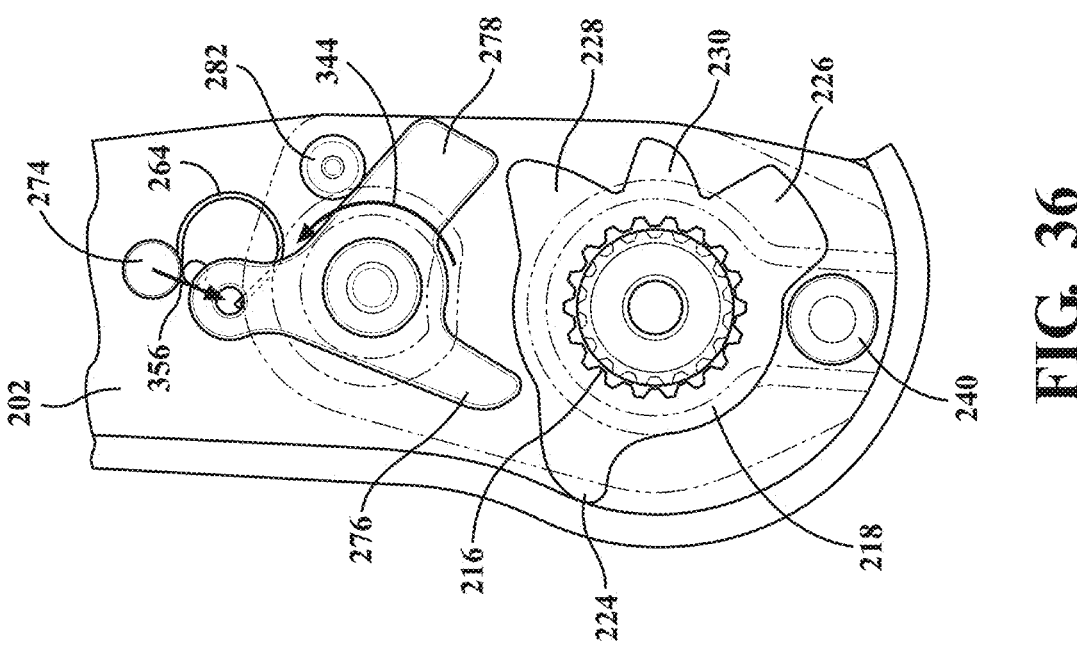
FIG. 36 further depicts the tailgate in the returned upright position in which the pawl is in the open/disengaged position and the tailgate is again free to rotate downwardly.

With reference now to remaining FIGS. 31-36, a series of sequential views are shown of the downward and return upright positions of the latch assembly pawl 250 and sector 218 components, which includes FIGS. 31 and 36 respectively and identically depicting each of initial and return upright positions. FIG. 31 presents a lower sectional view of the tailgate latch in the upright position in which the pawl 250 is depicted in an open/disengaged position, resulting from an exerted force from the spring 264 on the pawl resulting in a counterclockwise torque exerted by the pawl (see at 344) so that the first 276 and second 278 projecting portions of the pawl are not contacted by the spaced apart and radial projecting portions 224 and 228 of the sector as the tailgate 2 is free to rotate downwardly.

FIG. 32 presents a similar view to FIG. 31 and depicting the tailgate latch in an intermediate pivoted threshold position (which in the illustrated embodiment is shown at 60.9° relative to a vertical axis extending through a centerline of the main pivot 210, at which there is no torque exerted on the pawl 250 from the spring 264, and beyond which continued downward rotation of the tailgate 2 causes a reverse torque to be exerted on the pawl. As further depicted, a linear force extending through the pawl (see directional arrow 346 extending across centerline aperture 252 of the pawl).

Figures 33, 34:
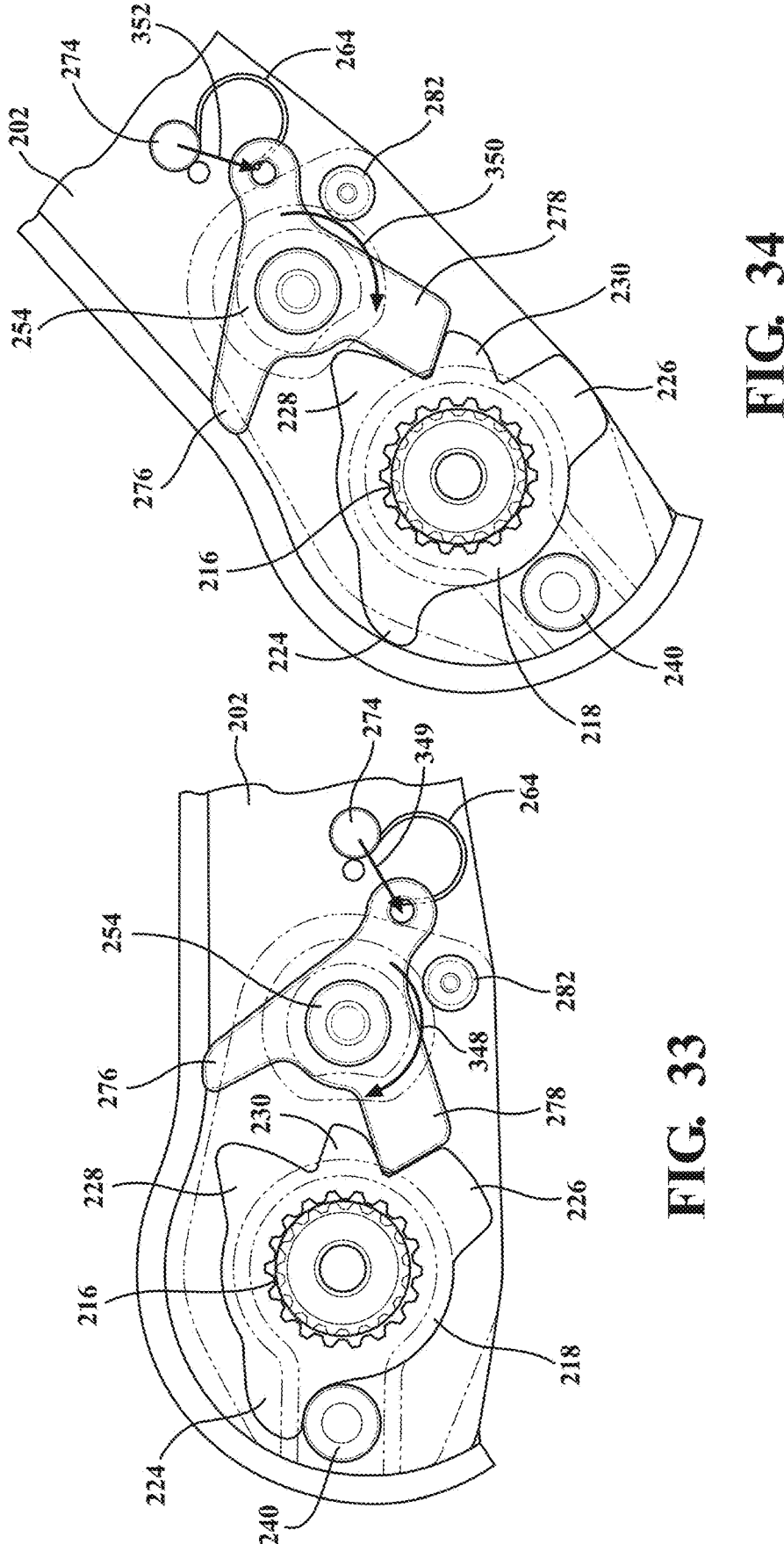
FIG. 33 presents a further succeeding view of the tailgate in a down position in which the pawl is in the lock position with a clockwise exerted torque, at which the tailgate is free to rotate upwardly.
FIG. 34 succeeds FIG. 33 and depicts an upwardly intermediate returning intermediate location of the tailgate latch which is assisted by the reverse torque exerted on the pawl.

FIG. 33 presents a further succeeding view of the tailgate in a down position (generally illustrated at 87° relative to the vertical axis extending through the main pivot) at which the pawl is in the lock position, depicted by its projecting portion 278 sandwiched between the opposing and circumferentially offset projecting portions 226 and 230 of the sector along with the further projecting portion 224 rotated into engagement with the stop rivet 240. At this point, a clockwise exerted torque (see directional arrow 348) is exerted by the spring 264 on the pawl, in combination with a separate linear directed force shown at 349, at which point the tailgate 2 is free to rotate in a return upright fashion.

FIG. 34 succeeds FIG. 33 and depicts an upwardly intermediate returning location of the tailgate latch (approximately 45° between either of horizontal or vertical axes extending through the main pivot). Upward rotation of the latch is exhibited by clockwise directional arrow 350 (similar to as shown at 348 in FIG. 33) which is facilitated by linear force exerted by the spring on the pawl (referenced by arrow 352 and as compared to as shown at 349 in FIG. 33) extending generally between the spring retaining rivet 274 and the upper end located aperture 268.

Figure 35:
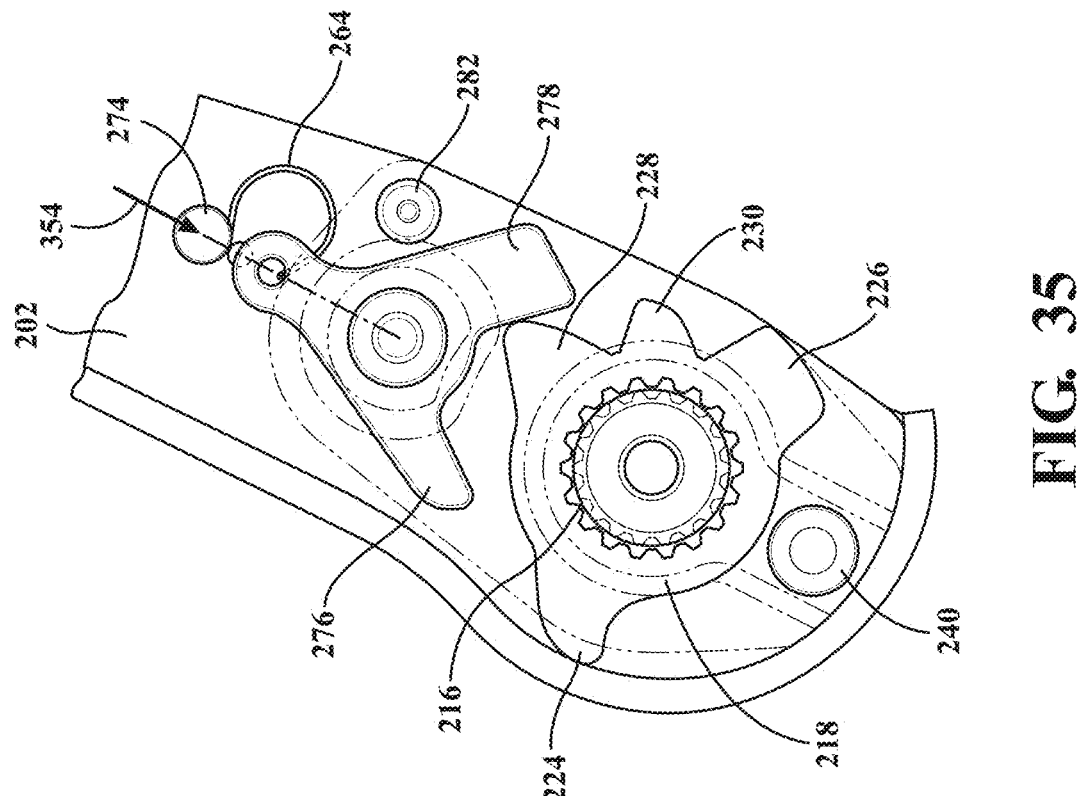
FIG. 35 succeeds FIG. 34 and depicts the pawl in a further upwardly rotated threshold position with the torque from the spring exerted on the pawl is removed, and at which continued upright rotation of the tailgate results in the torque on the pawl to be reversed.

FIG. 35 succeeds FIG. 34 and depicts the pawl in a further upwardly rotated threshold position, with the torque from the spring 264 exerted on the pawl removed, and at which continued upright rotation of the tailgate 2 results in the torque on the pawl to be reversed. A generally linear force (see directional arrow 354) is exerted by the spring 264 through a general centerline of the pawl with the pawl rotating in a counterclockwise direction (see directional arrow 355) relative to the fixed sector.

Finally FIG. 36 further depicts the tailgate in the returned upright position identical to that previously described in FIG. 31 at which the pawl is in the open/disengaged position and the tailgate is again free to rotate downwardly until stopping against the truck body in the opposite direction. This is again referenced by the counterclockwise torque (directional arrow 344) on the pawl as influenced by the linear offset force of the spring 264 (see further arrow 356)

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A latch assembly for pivotally securing a tailgate to a truck bed, comprising:

a package interior defining body adapted to being secured to a side of the tailgate and enclosing each of a sector, pawl and cam;

a pivot support adapted to being secured to each of first and second opposing side locations of the truck bed, said pivot support including a fixed portion communicating with a rotatable portion slaved to said sector;

said sector exhibiting a splined interior which seats a keyed bearing portion of said pivot support; and rotation of said cam in turn actuating said pawl to disengage from said sector, permitting in turn rotation of said tailgate.

2. The latch assembly as described in claim 1, said package defining body further comprising inner and outer plates.

3. The latch assembly as described in claim 2, further comprising a plurality of structural supporting bushings provided within said package interior defined body, with a lower of said bushings defining a pivotal support for said pawl.

4. The latch assembly as described in claim 2, further comprising an environmentally sealing gasket arranged between said inner and outer plates.

5. The latch assembly as described in claim 4, said gasket further comprising a plurality of perimeter spaced lateral protuberances which align with and resistively engage over notches associated with said inward most positioned of said plates.

6. The latch assembly as described in claim 1, further comprising an end most tenon portion of said main pivot support which is adapted to attach to a torsional spring located inside of the liftgate for inducing a lift assisting torque to the tailgate.

7. The latch assembly as described in claim 1, further comprising a release lever receiving a keyed shaft of a pivot support for said cam.

8. The latch assembly as described in claim 7, further comprising one or more torsional springs positioned at right and left handed sides of the latch assembly for biasing said release lever.

9. The latch assembly as described in claim 8, further comprising a cable rivet attached to an end of said release lever and in turn attaching a release cable.

10. A latch assembly for pivotally securing a tailgate to a truck bed, comprising:

a body adapted to being secured to a side of the tailgate and enclosing each of a pawl and sector;

a pivot support adapted to being secured to each of first and second opposing side locations of the tailgate in alignment with a main pivot extending through said sector, said main pivot further including an intermediate exteriorly toothed or splined portion;

said pawl exhibiting projecting portions which oppose circumferentially offset and radial projection portions of said sector; and a torque exerted by said pawl against said sector at selected downward and return upward pivoting directions, permitting rotation of the tailgate between each of upright, intermediate and down positions.

11. The latch assembly as described in claim 10, said body further comprising an inner plate and an outer plate surrounding said pawl and sector.

12. The latch assembly as described in claim 11, said pawl further comprising a central aperture through which is seated a pawl pivot rivet which in turn engages aligning apertures in said inner and outer plates, a spring includes a first end which seats through an upper end located aperture in said pawl, along with a second end which engages said inner plate.

13. The latch assembly as described in claim 11, further comprising a pair of rivets engaging respective pairs of securing apertures in said inner and outer plates.

14. The latch assembly as described in claim 11, further comprising outermost doubler plates which are secured to the outer faces of each of said inner and outer plates.

15. The latch assembly as described in claim 11, further comprising a spring connected at a first end to said pawl and at a second end to said inner plate for exerting the torque by said pawl against said sector.

16. The latch assembly as described in claim 10, said main pivot further comprising an end profile including any of an outer splined profile which can be engaged by a rotational output of a motor in a powered variant, or either of an end-configured "D" shape or double "D" profile.

17. The latch assembly as described in claim 10, said sector further comprising an interiorly geared profile through which said main pivot extends so that the intermediate splined portion is seated in alignment within said interior profile.

18. The latch assembly as described in claim 17, further comprising a stop rivet positioned between said inner and outer plates in proximity to an arcuate extending portion of said sector, said sector exhibiting a range of rotation between said radial projecting portions.

*    *    *    *    *